(12) United States Patent
Liu et al.

(10) Patent No.: US 9,837,198 B2
(45) Date of Patent: Dec. 5, 2017

(54) ELECTRONIC DEVICE

(71) Applicant: DELTA ELECTRONICS, INC., Taoyuan Hsien (TW)

(72) Inventors: Teng Liu, Taoyuan Hsien (TW); Ming-Hui Dai, Taoyuan Hsien (TW); Ke Dai, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 389 days.

(21) Appl. No.: 14/076,880

(22) Filed: Nov. 11, 2013

(65) Prior Publication Data

US 2014/0063864 A1 Mar. 6, 2014

Related U.S. Application Data

(63) Continuation-in-part of application No. 13/555,722, filed on Jul. 23, 2012, now Pat. No. 9,484,145.

(30) Foreign Application Priority Data

May 15, 2012 (CN) .......................... 2012 1 0166393
May 15, 2013 (CN) .......................... 2013 1 0178627

(51) Int. Cl.
*H01F 5/00* (2006.01)
*H01F 27/28* (2006.01)
(Continued)

(52) U.S. Cl.
CPC ......... *H01F 27/2804* (2013.01); *H01F 27/29* (2013.01); *H01F 27/40* (2013.01); *H02M 3/33576* (2013.01); *H01F 27/306* (2013.01); *H01F 27/346* (2013.01); *H01F 2027/2819* (2013.01); *H01F 2027/408* (2013.01); *H02M 7/003* (2013.01)

(58) Field of Classification Search
CPC .................................. H01F 5/00; H01F 27/28
USPC .................................................. 336/200, 232
See application file for complete search history.

(56) References Cited

U.S. PATENT DOCUMENTS 6,211,767 B1 * 4/2001 Jitaru .................. H01F 27/2804
336/200
6,501,233 B1 * 12/2002 Odell ..................... H05B 37/02
315/294

(Continued)

FOREIGN PATENT DOCUMENTS

CN          1227660 A     9/1999
CN        101017730 A     8/2007
(Continued)

*Primary Examiner* — Tsz Chan
(74) *Attorney, Agent, or Firm* — CKC & Partners Co., Ltd.

(57) ABSTRACT

An electronic device includes a magnetic element, a first circuit module and a second circuit module. The magnetic component includes a magnetic core set and a winding, and the winding includes a first winding and a second winding, and the winding is assembled on the magnetic core set. The first circuit module is connected to the first winding of the magnetic element. The second circuit module is connected to the second winding of the magnetic element. The first circuit module or/and the second circuit module has/have an overlap portion with the winding on a vertical projection area of a first plane, and the first plane is the first plane is a horizontal plane at which the winding is located.

45 Claims, 20 Drawing Sheets

(51) Int. Cl.
*H02M 3/335* (2006.01)
*H01F 27/29* (2006.01)
*H01F 27/40* (2006.01)
H02M 7/00 (2006.01)
H01F 27/30 (2006.01)
H01F 27/34 (2006.01)

(56) References Cited

U.S. PATENT DOCUMENTS

| | | | |
|---|---|---|---|
| 2010/0164670 A1* | 7/2010 | Nakahori | H01F 27/2804 336/200 |
| 2011/0032683 A1* | 2/2011 | Li | H05K 7/1432 361/760 |
| 2011/0050379 A1 | 3/2011 | Kim | |
| 2011/0205008 A1 | 8/2011 | Brennan | |

FOREIGN PATENT DOCUMENTS

| | | |
|---|---|---|
| CN | 101231907 A | 7/2008 |
| CN | 201081806 Y | 7/2008 |
| CN | 201084533 Y | 7/2008 |
| CN | 201138608 Y | 10/2008 |
| CN | 101770853 A | 7/2010 |
| CN | 101859638 A | 10/2010 |
| CN | 102243918 A | 11/2011 |
| CN | 102360787 A | 2/2012 |
| CN | 103427597 A | 12/2013 |
| TW | 231358 B | 10/1994 |
| TW | 201106145 A | 2/2011 |
| TW | 201222582 A | 6/2012 |
| WO | 2011/152686 A2 | 12/2011 |

* cited by examiner

__US 9,837,198 B2__

ELECTRONIC DEVICE

RELATED APPLICATIONS

The present application is a continuation-in-part application of U.S. application Ser. No. 13/555,722, filed Jul. 23, 2012 which itself claims priority to Chinese Application Serial Number 201210166393.4, filed May 15, 2012, which is herein incorporated by reference. This application claims priority to Chinese Application Serial Number 201310178627.1, filed May 15, 2013, which is herein incorporated by reference.

BACKGROUND

Field of Invention

The present invention relates to an electronic device in power electronic fields. More particularly, the present invention relates to an electronic device including a magnetic element.

Description of Related Art

With respect to a conventional transformer, a planar transformer uses the material such as a single-layer or multi-layer printed wiring board (PWB) or copper foil to replace copper wires in the conventional transformer. Wires in the planar transformer are actually a planar conductor, in which currents flow to its edges away form its center, but the currents still all flow through the planar conductor, and thus quite a high current density can be obtained. Further, because a magnetic core used in the planar transformer has a small volume, such that a large surface area, a flat profile, better heat dissipation could be achieved, and a better efficiency can be obtained. Furthermore, the planar transformer advantageously has a compact structure, better coupling and good insulation, etc., such that the planar transformer is suitable for product miniaturization, and has been applied to various products, such as a power converter.

Referring to FIG. 1, FIG. 1 is a schematic block diagram showing the circuit principle according to a power converter including a planar transformer.

As shown in FIG. 1, a power converter 1 includes a planar transformer 11, a secondary-side circuit module 12 and a primary-side circuit module 13. The secondary-side circuit module 12 is coupled to a secondary side of the planar transformer 11, and the primary-side circuit module 13 is coupled to a primary side of the planar transformer 11.

Further, referring to FIG. 2, FIG. 2 is a schematic structural diagram showing a power converter having a conventional planar transformer.

The planar transformer 11 includes a magnetic core and a winding (not shown), in which the secondary-side circuit module 12 is connected to the winding through a secondary-side outlet connector, and the primary-side circuit module 13 is connected to the winding through a primary-side outlet connector.

However, a current loop formed from a winding outlet connector of the conventional planar transformer 11 and an external circuit module of the conventional planar transformer 11 may store relatively large magnetic energy, and thus larger leakage inductance may be formed. For example, a loop formed from the secondary-side outlet connector of the winding and the secondary-side circuit module 12 may form larger leakage inductance. The leakage inductance is an important index for the planar transformer. For example, if the leakage inductance exists in a switching mode power supply, a counter electromotive force will be caused by the leakage inductance when a switch device is turned off instantaneously, in which the counter electromotive force is likely to cause an over voltage breakdown of the switch device. Further, the leakage inductance may form an oscillation circuit with distributed capacitors in the external circuit and the planar transformer windings; further generating oscillation and electromagnetic energy radiating outward, resulting in electromagnetic interference (EMI). Furthermore, as to some transformers, such as a flyback transformer, the leakage inductance will cause loss, thus lowering the efficiency of the flyback transformer.

In view of this, it is a technical problem to be solved by technical people in the industry regarding how to design a converter to reduce magnetic energy stored in a loop formed from an outlet connector of a planar transformer and an external circuit for reducing leakage inductance by changing the structure of the planar transformer.

SUMMARY

In order to resolve the aforementioned problem, the present invention provides an electronic device. The electronic device includes a magnetic element, a first circuit module and a second circuit module. The magnetic element includes a magnetic core set and a winding assembled in the magnetic core set, and the winding includes a first winding and a second winding. The first circuit module is coupled to the first winding of the magnetic element. The second circuit module is coupled to the second winding of the magnetic element, in which a vertical projection area/areas of the first circuit module or/and the second circuit module has/have an overlap portion with a vertical projection area of the winding of the magnetic element on a first plane, and the first plane is a horizontal plane at which the winding is located.

According to an embodiment of the present invention, the magnetic element is a transformer module, the first winding is a primary winding, and the second winding is a secondary winding.

According to an embodiment of the present invention, the transformer module is a planar transformer.

According to an embodiment of the present invention, the magnetic core set includes a first magnetic core component and a second magnetic core component corresponding to the first magnetic core component. The first magnetic core component has a magnetic core column, a core cover plate, a first side column, a second side column, a primary-side opening and a secondary-side opening, in which the primary-side opening and the secondary-side opening are located at both ends of the first side column and the second side column, and the winding is assembled between the first magnetic core component and the second magnetic core component, and is mounted on the magnetic core column.

According to an embodiment of the present invention, at least one uncovered area exists between a vertical projection area of the first magnetic core element or the second magnetic core element on the first plane and the vertical projection area of the winding of the magnetic element on the first plane, such that at least one portion of the first circuit module or/and the second circuit module is vertically projected within the uncovered area and has an overlap portion with the vertical projection area of the winding on the first plane.

According to an embodiment of the present invention, a thickness of the core cover plate of the first magnetic core component is greater than a thickness of the second magnetic core component when at least one uncovered area exists between the vertical projection area of the first magnetic core element on the first plane and the vertical projection area of the winding of the magnetic element on the first plane.

According to an embodiment of the present invention, a thickness of core cover plate of the first magnetic core component is smaller than a thickness of the second magnetic core component when the at least one uncovered area exists between the vertical projection area of the second magnetic element on the first plane, and the vertical projection area of the winding of the magnetic element on the first plane.

According to an embodiment of the present invention, the primary-side opening and the secondary-side opening are not symmetric in shape with respect to the magnetic core column.

According to an embodiment of the present invention, at least one uncovered area exists between vertical projection areas of the first magnetic core element and the second magnetic core element on the first plane, and the vertical projection area of the winding of the magnetic element on the first plane, such that at least one portion of the first circuit module or/and the second circuit module is vertically projected within the uncovered area and has an overlap portion with the vertical projection area of the winding on the first plane.

According to an embodiment of the present invention, the vertical projection area of the first magnetic core component has no overlap portion with the vertical projection area of the second magnetic core component on the first plane.

According to an embodiment of the present invention, the vertical projection area of the first magnetic core component has an overlap portion with the vertical projection area of the second magnetic core component on the first plane.

According to an embodiment of the present invention, the first side column and the second side column are not symmetric in shape with respect to the magnetic core column.

According to an embodiment of the present invention, a length of the first side column between the primary-side opening and the secondary-side opening is greater than a length of the second side column between the primary-side opening and the secondary-side opening.

According to an embodiment of the present invention, shapes of the first magnetic core component and the second magnetic core component along the primary-side opening or the secondary-side opening are concave arcs.

According to an embodiment of the present invention, a vertical projection area of the first magnetic core component and the second magnetic core component on the first plane have an overlap portion with the vertical projection area of the winding on the first plane, wherein the first magnetic core component or the second magnetic core component has a groove which has an overlap portion with the vertical projection area of the winding on the first plane, and at least one portion of the first circuit module or the second circuit module is disposed in the groove.

According to an embodiment of the present invention, both ends of the primary winding are coupled to the first circuit module through a primary-side outlet connector which has an primary-side inner outlet connector, primary-side outlet connector vias and a primary-side outer outlet connector, the primary-side inner outlet connector is electronically connected to the primary-side outer outlet connector through the primary-side outlet connector vias. Both ends of the secondary winding are coupled to the second circuit module through a secondary-side outlet connector which has a secondary-side inner outlet connector, second-ary-side outlet connector vias and a secondary-side outer outlet connector, the secondary-side inner outlet connector is electronically connected to the secondary-side outer outlet connector through the secondary-side outlet connector vias.

According to an embodiment of the present invention, the primary-side outlet connector vias are disposed between the primary winding and the magnetic core column, or on the primary winding or an outside area of the primary winding, and the secondary-side outlet connector vias are disposed between the secondary winding and the magnetic core column, or on the secondary winding or an outside area of the secondary winding.

According to an embodiment of the present invention, a component of the first circuit module sensitive to leakage inductance is disposed at a side of the primary-side outlet connector vias near the magnetic core column when the primary-side outlet connector vias are disposed on an outside area of the primary winding. A component of the second circuit module sensitive to leakage inductance disposed at a side of the secondary-side outlet connector vias near the magnetic core column when the secondary-side outlet connector vias are disposed on an outside area of the secondary winding.

According to an embodiment of the present invention, the winding is a planar winding including a PCB winding or a round wire.

According to an embodiment of the present invention, the electronic device is a flyback converter.

According to an embodiment of the present invention, the second circuit module is a rectifier circuit module.

According to an embodiment of the present invention, at least one of the first circuit module and the second circuit module forms an AC loop with its corresponding winding, wherein an area ratio of a vertical projection area of the AC loop on the first plane to an overlap portion of vertical projection areas of all of the loops around the same magnetic core column of the magnetic core set on the first plane is in a range substantially from 1 to 1.2.

According to an embodiment of the present invention, the first winding is a primary winding, and the first circuit module forms an AC loop with the primary winding, wherein an area ratio of a vertical projection area of the AC loop on the first plane to an overlap portion of vertical projection areas of all of the loops around the same magnetic core column of the magnetic core set on the first plane is in a range substantially from 1 to 1.2.

According to an embodiment of the present invention, wherein the second winding is a secondary winding, and the second circuit module forms an AC loop with the secondary winding, wherein an area ratio of a vertical projection area of the AC loop on the first plane to an overlap portion of vertical projection areas of all of the loops around the same magnetic core column of the magnetic core set on the first plane is in a range substantially from 1 to 1.2.

According to an embodiment of the present invention, the secondary winding includes a first secondary winding and the second secondary winding, and the rectifier circuit module includes a first switch module, a first capacitor module, a second switch module and a second capacitor module. The first capacitor module and the first switch module are connected to the first secondary winding and disposed on an upper surface of the first secondary winding. The second capacitor module and the second switch module are connected to the second secondary winding and disposed on a lower surface of the second secondary winding.

According to an embodiment of the present invention, the secondary winding includes a first secondary winding and the second secondary winding, and the rectifier circuit module includes a first switch module, a capacitor module and a second switch module. The first switch module connected to the first secondary winding. The capacitor module and the first switch module connected to the capacitor module disposed on an upper surface of the first secondary winding. The second switch module disposed on the lower surface of the second secondary winding and connected to the capacitor module through the vias.

According to an embodiment of the present invention, the first switch module, the first capacitor module, the second switch module or the second capacitor is disposed in a PCB board.

According to an embodiment of the present invention, the first switch module or the second switch module is a chip disposed in a PCB board.

According to an embodiment of the present invention, the capacitor module is formed from a PCB substrate doped with a dielectric material.

According to an embodiment of the present invention, the magnetic core set on the first plane has an overlap portion with a vertical projection area of the first circuit module or the second circuit module on the first plane.

According to an embodiment of the present invention, the magnetic core set includes a first magnetic core component and a second magnetic core component corresponding to the first magnetic core component, the first magnetic core component having a magnetic core column, a core cover plate, a first side column, a second side column, a primary-side opening and a secondary-side opening. The primary-side opening and the secondary-side opening are located at both ends of the first side column and the second side column, and the winding is assembled between the first magnetic core component and the second magnetic core component on the magnetic core column.

According to an embodiment of the present invention, the primary-side opening and the secondary-side opening are not symmetric in shape with respect to the magnetic core column, and the first circuit module or the second circuit module is disposed at a wider one of the primary-side opening and the secondary-side opening.

According to an embodiment of the present invention, the vertical projection area of the second magnetic core component on the first plane falls within a vertical projection area of the core cover plate of the first magnetic core component on the first plane.

According to an embodiment of the present invention, a thickness of the second magnetic core component is greater than a thickness of the core cover plate of the first magnetic core component.

According to an embodiment of the present invention, the first magnetic core component or the second magnetic core component has a concave arc along the primary-side opening or the secondary-side opening, and at least one portion of the first circuit module or at least one portion of the second circuit module is disposed in the concave arc.

According to an embodiment of the present invention, the magnetic core set further comprises an accommodation portion for receiving the first circuit module or the second circuit module.

According to an embodiment of the present invention, the accommodation portion is a groove, which is disposed on the first magnetic core component or the second magnetic core component, and at least one portion of the first circuit module or the second circuit module is disposed in the groove.

According to an embodiment of the present invention, the accommodation portion is disposed at a side of the magnetic core column near the first second circuit module or the second circuit module.

According to an embodiment of the present invention, the accommodation portion is disposed at a side of the first side column or the second side column near the first second circuit module or the second circuit module.

According to an embodiment of the present invention, the magnetic core set further includes a first core cover plate, a second core cover plate and a plurality of the magnetic core columns which are connected to the first core cover plate and the second core cover plate to form a closed magnetic path.

According to an embodiment of the present invention, the magnetic core set further includes a first core cover plate, a second core cover plate and a plurality of side columns. The plurality of side columns is disposed around the magnetic core column of the magnetic core set, wherein the side columns are connected to the first core cover plate to form a plurality of side openings.

According to an embodiment of the present invention, the magnetic core includes an EQ-type magnetic core, a U-type magnetic core, an EE-type magnetic core, an EI-type magnetic core, an EFD-type magnetic core, a RM-type magnetic core or a tank-type magnetic core.

It can be known from the above that the electronic device mentioned in the present invention can reduce the magnetic energy stored in a loop, which is formed from a outlet connector of planar transformer and an external circuit by changing the structure of the outlet connector of the magnetic element, the first circuit module or/and the second circuit module, and the structure of the magnetic core set to reduce a leakage inductance.

It is to be understood that both the foregoing general description and the following detailed description are by examples, and are intended to provide further explanation of the invention as claimed.

BRIEF DESCRIPTION OF THE DRAWINGS

In order to understand features, advantages and other purposes of the above of the present invention, the description of the accompanying diagrams as follows.

DETAILED DESCRIPTION

The following embodiments are exemplified with accompanying diagrams for detailed description, but the present embodiments should not be limited to the scope of which the present invention is covered, and the description of structure operation should not be limited to the operation order. The equal efficiency devices produced by rebuilding any structures from elements are covers within the scope of the present invention. Furthermore, the accompanying diagrams are shown for description purpose, and not drew in the original size.

1$^{st}$ Embodiment

Figure 1:
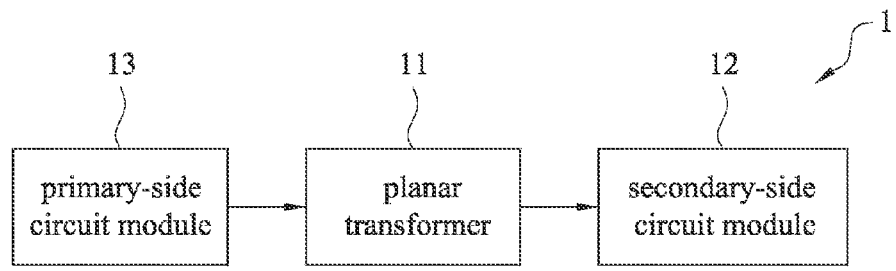
FIG. 1 is a schematic block diagram showing of circuit principle according to a power converter including a planar transformer.
Figure 2:
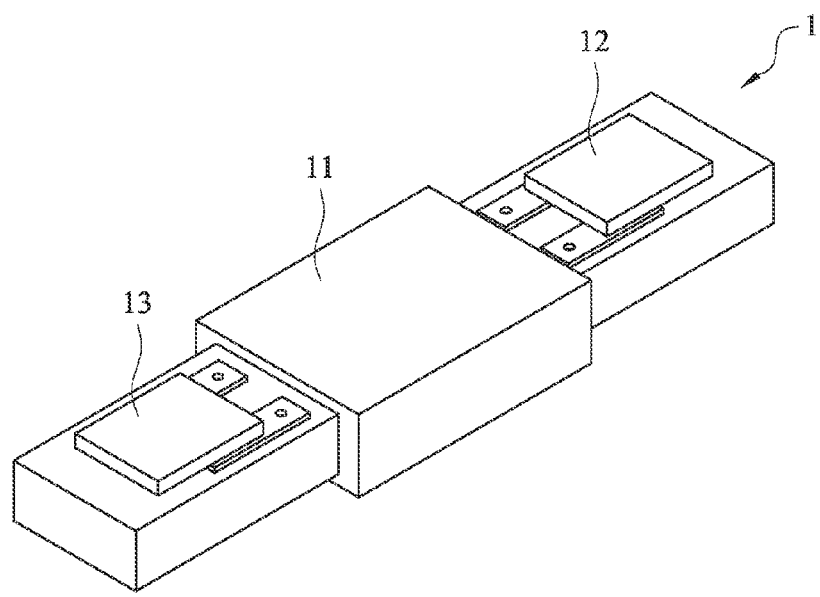
FIG. 2 is a schematic structure diagram showing a power converter having a conventional planar transformer.
Figure 3A:
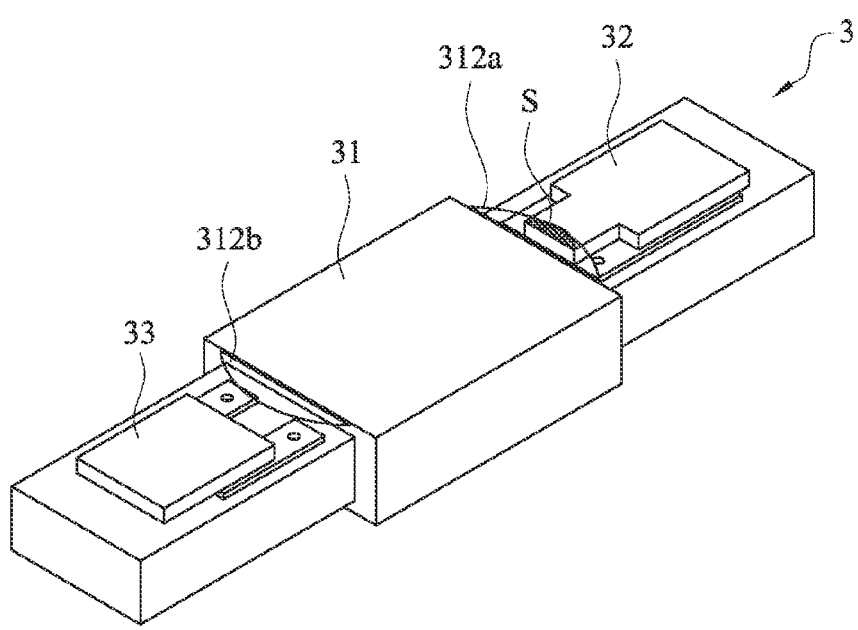
FIG. 3A is a schematic structure diagram showing an electronic device according to a $1^{st}$ embodiment of the present invention.
Figure 3B:
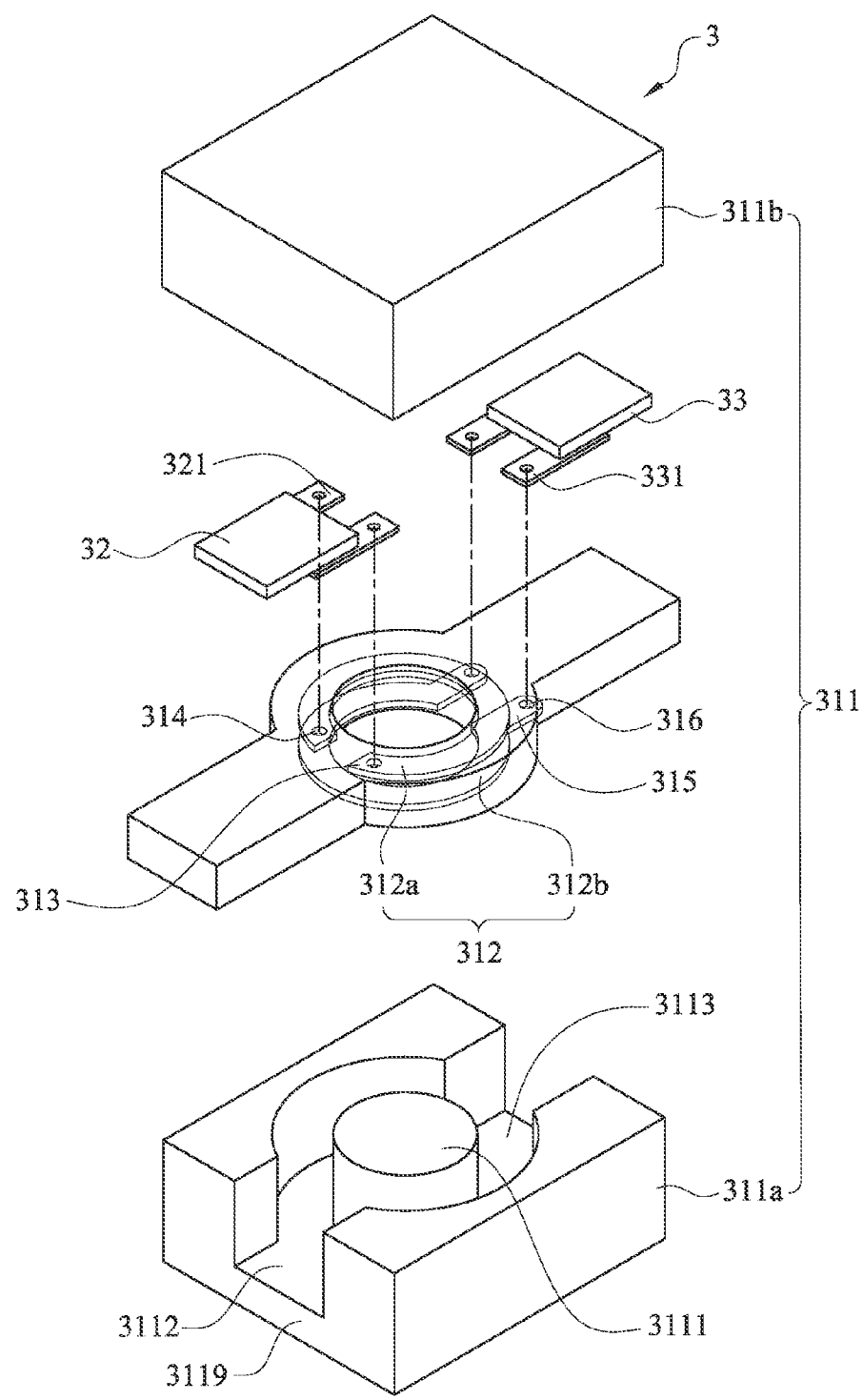
FIG. 3B is an exploded view showing the electronic device shown in FIG. 3A.

Referring to FIGS. 3A and 3B, FIG. 3A is a schematic structure diagram showing an electronic device according to a 1$^{st}$ embodiment of the present invention, and FIG. 3B is an exploded view showing the electronic device shown in FIG. 3A As shown in FIGS. 3A and 3B, an electronic device includes a magnetic element (such as transformer module) 31, a second circuit module 32 and a first circuit module 33.

The magnetic element 31 includes a magnetic core set 311 and a winding 312. The magnetic core set 311 includes a first magnetic core component 311a and a second magnetic core component 311b corresponding to the first magnetic core component 311a. The first magnetic core component 311a having a magnetic core column 3111, a secondary-side opening 3112, a primary-side opening 3113 and a core cover plate 3119. The winding 312 includes a second winding (such as secondary winding) 312a and the first winding (such as primary winding) 312b; the winding 312 is assembled on the magnetic core set 311. Specifically, the winding 312 is assembled between the first magnetic core component 311a and the second magnetic core component 311b, and mounted on the magnetic core column 3111. Generally speaking, a portion of a magnetic core on which the winding is coiled is referred to as a magnetic core column (such as the magnetic core column 3111). The magnetic core column generally is cylindrical or cuboid, and the core cover plate (such as the core cover plate 3119) is disposed in parallel on both opposite sides of the magnetic core column, and the core cover plate is perpendicular to the magnetic core column. Furthermore, side columns (such as magnetic core side columns 3114 and 3115 described later) are disposed in parallel with the magnetic core column, and perpendicular to the core cover plate.

The second circuit module 32 is couple to the second winding (such as a secondary winding) 312a of the magnetic element 31; and the first circuit module 33 is coupled to the first winding (such as a primary winding) 312b of the magnetic element 31. For example, the second circuit module 32 may be a rectifier circuit module, such as a rectifier circuit structure of a half-wave rectifier circuit or a center-tap full-wave rectifier circuit.

Both ends of the second winding (such as the secondary winding) 312a are coupled to the second circuit module 32 through a secondary-side outlet connector. The secondary-side outlet connector includes a secondary-side inner outlet connector 313, secondary-side outlet connector vias 314 and a secondary-side outer outlet connector 321, in which the secondary-side inner outlet connector 313 is electronically connected to the secondary-side outer outlet connector 321 through the secondary-side outlet connector vias 314. Likewise, both ends of the first winding (such as the primary winding) 312b are coupled to the first circuit module 33 through a primary-side outlet connector. The primary-side outlet connector has a primary-side inner outlet connector 315, primary-side outlet connector vias 316 and a primary-side outer outlet connector 331, in which the primary-side inner outlet connector 315 is electronically connected to the primary-side outlet connector 331 through the primary-side outlet connector vias 316. The secondary-side outlet connector vias 314 may also be disposed on an outside area of the second winding (such as the secondary winding) 312a, but is not limited thereto, and may also be disposed between the second winding 312a and the magnetic core column 3111, or on the second winding 312a. Likewise, the primary-side outlet connector vias 316 may be disposed on an outside area of the first winding (such as the secondary winding) 312b, but is not limited thereto, and may also be disposed between the first winding 312b and the magnetic core column 3111, or on the first winding 312b.

At least one uncovered area exists between areas of a first plane on which the first magnetic core component 311a and the second magnetic core component 311b is vertically projected, and an area of the first plane on which the winding 312 is vertically projected (the uncovered area is a portion of the vertical projection area of the winding 312 on the first plane which is not covered by the vertical projection areas of the first magnetic core element 311a or the second magnetic element 311b on the first plane, and may be disposed on the secondary side or the primary side. The first plane is a horizontal plane at which the second winding 312a is located.

In this embodiment, the vertical projection areas of the first magnetic core component 311a of the magnetic core set 311 on the first plane have an overlap portion with the vertical projection area of the second magnetic core component 311b on the first plane. An uncovered area (not shown) exists at the secondary side between the vertical projection areas of the first magnetic core component 311a and the second magnetic core component 311b on the first plane and the vertical projection area of the winding 312 on the first plane, and meanwhile, the second circuit module 32 is moved toward the magnetic core column 3111, and is vertically projected within the uncover area, such that the vertical projection areas of the second circuit module 32 and the winding 312 (the second winding 312a specifically) on the first plane have an overlap portion S, thereby reducing the lengths of the secondary-side inner outlet connector 313 and the outer outlet connector 321. Thus, in comparison with the existing technology, an area of a secondary-side outlet connector loop formed from the second circuit module 32, the secondary-side outer outlet connector 321, the secondary-side outlet connector vias 314 and the secondary-side inner outlet connector 313 is decreased, thereby decreasing the energy stored in the magnetic field generated from the secondary-side outlet connector loop and reducing its leakage inductance.

In this embodiment, the magnetic element 31 may be a planar transformer, i.e., the winding 312 is a planar winding. For example, the magnetic element 31 may be a PCB planar winding, a foil planar winding or a planar winding composed of circular wires.

In this embodiment, only the second circuit module 32 is used for explanation, because the number of turns in the secondary winding of a planar transformer is generally less and the leakage inductance of a secondary-side outlet connector occupies quite a high proportion of the leakage inductance of the planar transformer. But, in another embodiment, an uncovered area on the primary side may exist between the vertical projection areas of the first magnetic core component 311a and the second magnetic core component 311b on the first plane and the vertical projection area of the winding 312 on the first plane, and the first circuit module 33 is moved toward the magnetic core column 3111, and is vertically projected on the uncover area, such that the vertical projection area of the first circuit module 33 has an overlap portion with the vertical projection area of the winding 312 (the first winding 312b specifically) on the first plane, thereby reducing the leakage inductance formed from the primary-side outlet connector loop. In another embodiment, uncovered areas may exist on both of the primary side and the secondary side and also exists between the vertical projection areas of the first magnetic core component 311a and the second magnetic core component 311b on the first plane and the vertical projection area of the winding 312 on the first plane, and the second circuit module 32 and first circuit module 33 is moved toward the direction of the magnetic core column 3111, such that the second circuit module 32 is vertically projected on the uncovered area of secondary side, and the first circuit module 33 is vertically projected on the uncovered area of primary side, and then the vertical projection areas of the second circuit module 32 and the first circuit module 33 have an overlap portion with the vertical projection area of the winding 312 on the first plane, thereby reducing the leakage inductances formed form the secondary-side outlet connector loop and the primary-side outlet connector loop.

$2^{nd}$ Embodiment

Figure 4:
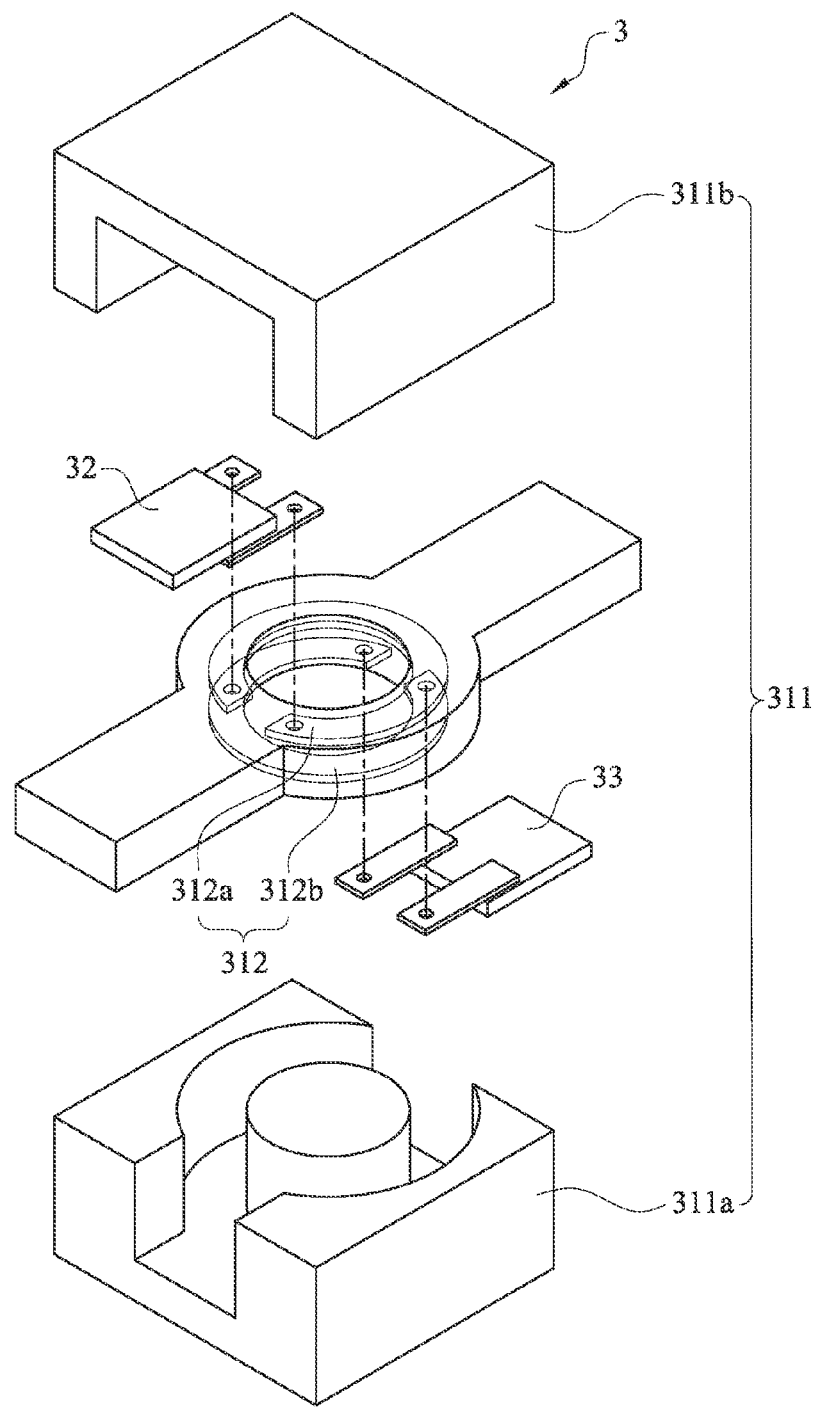
FIG. 4 is an exploded view showing an electronic device according to a $2^{nd}$ embodiment of the present invention.

The difference between a $2^{nd}$ embodiment and the $1^{st}$ embodiment is that the vertical projection areas of the first magnetic core component 311a and the second magnetic core component 311b have no overlap portion. Referring to FIG. 4, FIG. 4 is a schematic structure diagram showing an electronic device according to the $2^{nd}$ embodiment of the present invention. An uncovered area exists at the secondary side between the vertical projection area of the first magnetic core component 311a on the first plane and the vertical projection area of the winding 312 on the first plane, and meanwhile, an uncovered area exists at the primary side between the vertical projection area of the second magnetic core component 311b on a first plane and the vertical projection area of the winding 312 on the first plane at the same time. At this point, the second circuit module 32 and the first circuit module 33 is moved toward the magnetic core column 3111, such that the second circuit module 32 is vertically projected on the uncovered area of secondary side, and the first circuit module 33 is vertically projected on the uncovered area of primary side, and further the vertical projection areas of the second circuit module 32 and the first circuit module 33 have an overlap portion with the vertical projection area of the winding 312 on the first plane. As shown in FIG. 4, the second circuit module 32 is disposed at a side of the second magnetic core component 311b, and is moved toward the second magnetic core component 311b, such that the vertical projections of the second circuit module 32 have an overlap portion with the vertical projections of the second winding 312a on the first plane. The first circuit module 33 is disposed at a side of the core cover plate 3119 of the first magnetic core component 311a, and is moved toward the first magnetic core component 311a, such that the vertical projection area of the first circuit module 33 has an overlap portion with the vertical projection area of the first winding 312b on the first plane. However, it is noted that, in other embodiments, the second circuit module 32 may be disposed at a side of the core cover plate 3119 of the first magnetic core component 311a, or the first circuit module 33 may be disposed at a side of the second magnetic core component 311b, but is not limited thereto. Therefore, the leakage inductance formed from the secondary-side outlet connector loop or/and the primary-side outlet connector loop can be reduced.

3$^{rd}$ Embodiment

Figure 5A:
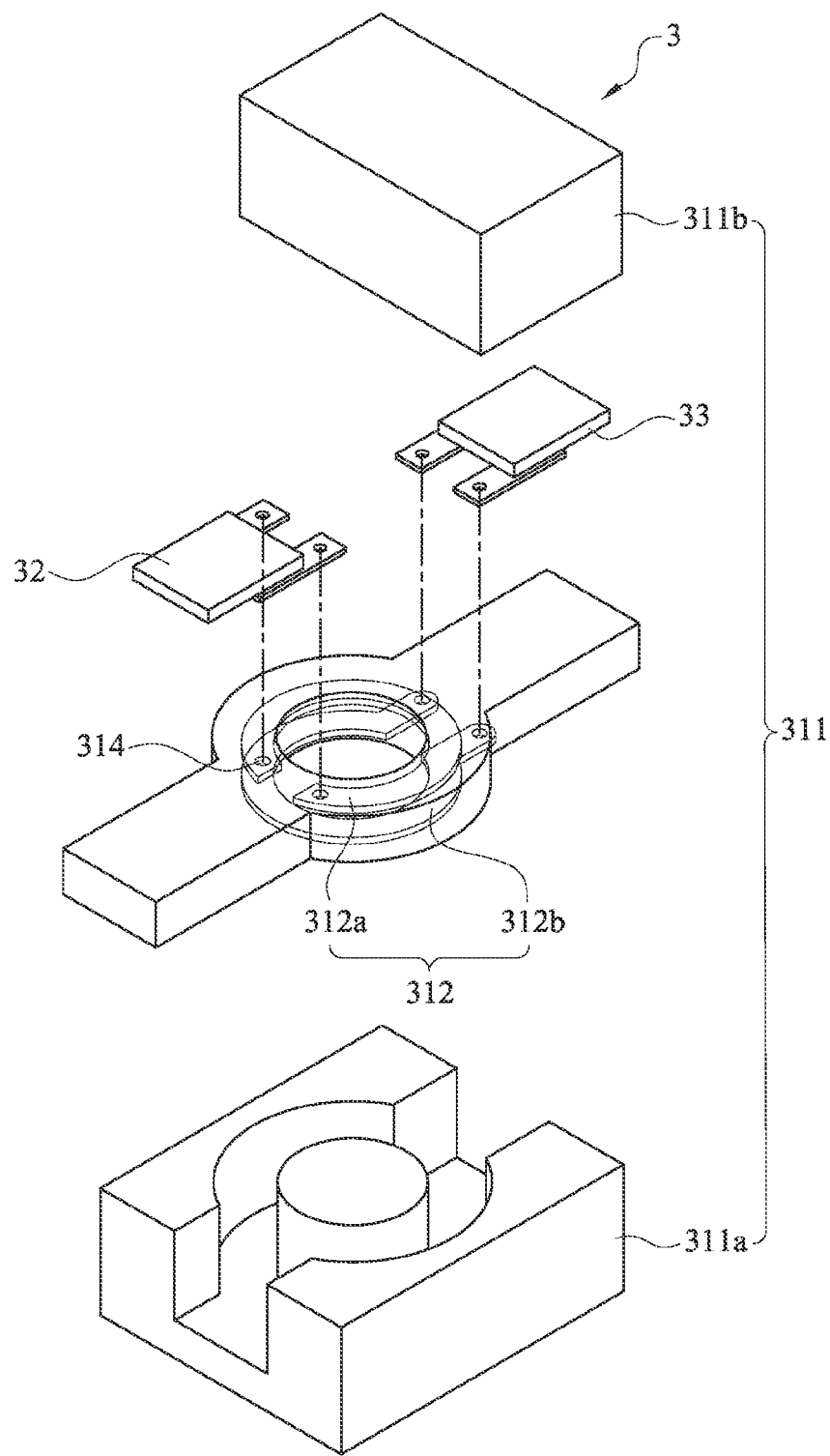
FIG. 5A is an exploded view showing an electronic device according to a $3^{rd}$ embodiment of the present invention.
Figure 5B:
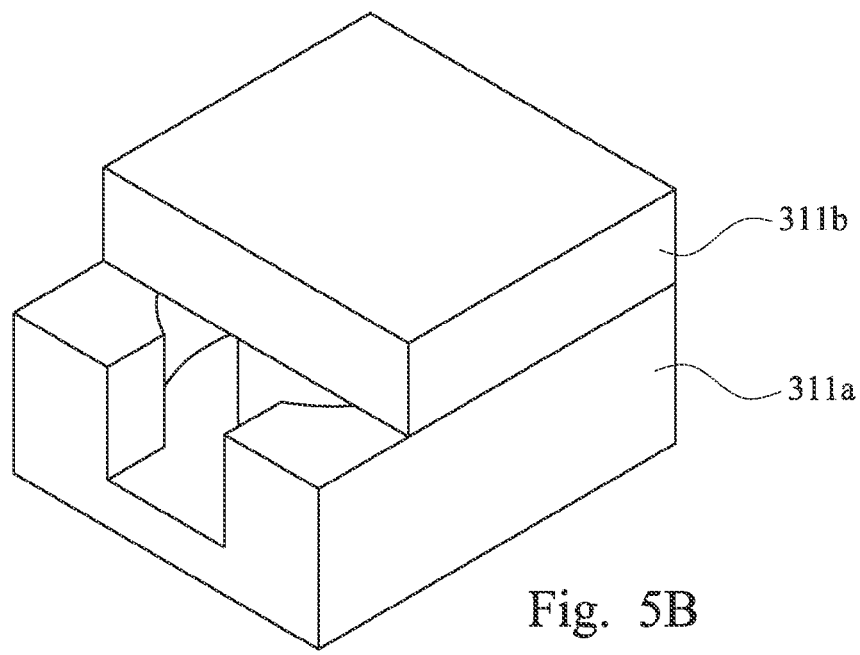
FIG. 5B is a schematic diagram showing a magnetic core set of the electronic device shown in FIG. 5A.

Referring to FIGS. 5A and 5B, FIG. 5A is an exploded view showing an electronic device according to a 3$^{rd}$ embodiment of the present invention, and FIG. 5B is a schematic diagram showing a magnetic core set of the electronic device shown in FIG. 5A In this embodiment, the vertical projection area of the first magnetic core component 311a on the first plane may cover the entire vertical projection area of the winding 312 on the first plane, and an uncovered area exists between the vertical projection area of the second magnetic core component 311b on the first plane and the vertical projection area of the winding 312 on the first plane. Alternatively, the vertical projection area of the second magnetic core component 311b may cover the entire vertical projection area of the winding 312 on the first plane, and an uncovered area exists between the vertical projection area of the first magnetic core component 311a on the first plane and the vertical projection area of the winding 312 on the first plane, but is not limited thereto. As shown in the figures, the vertical projection area of the first magnetic core component 311a is as a whole overlapped with the vertical projection area of the winding 312 on the first plane. At this point, a non-overlap area (not shown) exists at the secondary side between the vertical projection areas of the second magnetic core component 311b and the vertical projection area of the winding 312 on the first plane, i.e., the portion of the vertical projection area of the winding 312 on the first plane which is not covered by the vertical projection area of the second magnetic core component on the first plane. If the portion of the vertical projection area of the winding 312 on the first plane is not covered by the vertical projection area of the second magnetic core component 311b on the first plane, the second circuit module 32 is moved toward the second core component 311b, such that at least one of the second circuit module 32 is vertically projected on an uncovered area, and the vertical projection area of the second circuit module 32 on the first plane has an overlap portion with the vertical projection area of the winding 312 on the first plane, thereby reducing the leakage inductance formed from the secondary-side outlet connector loop. It is noted that, in other embodiments, a non-overlap area may exist at the primary side between the vertical projection areas of the second magnetic core component 311b and the winding 312 on the first plane, and the first circuit module 33 is moved toward the direction of the magnetic core component 311b, and further at least one portion of the first circuit module 33 is vertically projected on the uncovered area, and the vertical projection areas of the first circuit module 33 and the winding 312 on the first plane have an overlap portion, thereby reducing the leakage inductance formed from the primary-side outlet connector loop.

4$^{th}$ Embodiment

Figure 6:
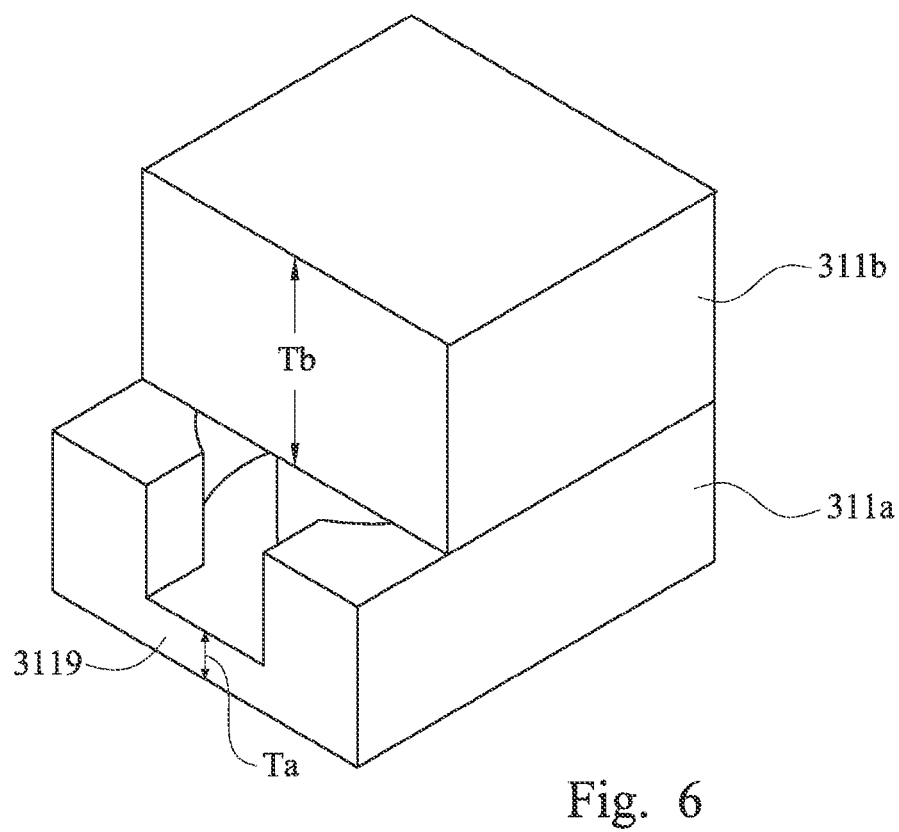
FIG. 6 is a schematic structure diagram showing a magnetic core set according to a $4^{th}$ embodiment of the present invention.

Referring to FIG. 6, FIG. 6 is a schematic structure diagram showing a magnetic core set according to a 4$^{th}$ embodiment of the present invention.

The difference between this embodiment and the 3$^{rd}$ embodiment is that a thickness Ta of the core cover plate 3119 of the first magnetic core component 311a is smaller than a thickness Tb of the second magnetic core component 311b. By this magnetic core set structure, and in comparison with the 3$^{rd}$ embodiment under the same condition of magnetic core material, this magnetic core set structure has a lower magnetic core loss than the magnetic core set structure shown in FIG. 5B. In other embodiments, a thickness of the core cover plate 3119 of the first magnetic core component 311a may be greater than a thickness of the second core magnetic core component 311b, to reduce the magnetic core loss.

5$^{th}$ Embodiment

Figure 7:
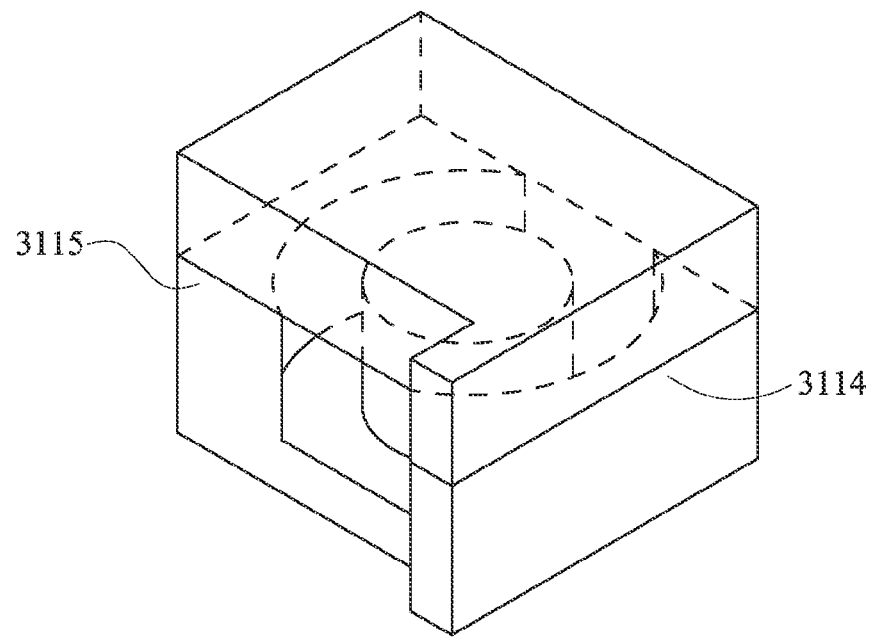
FIG. 7 is a schematic structure diagram showing a magnetic core set according to a $5^{th}$ embodiment of the present invention.

Referring to FIG. 7, FIG. 7 is a schematic structure diagram showing a magnetic core set according to a 5$^{th}$ embodiment of the present invention, The difference between this embodiment and the 1$^{st}$ embodiment is the a side column 3114 and a side column 3115 in the magnetic core set 311 is not symmetric to the magnetic core column 3111. As shown in the figure, the lengths of the side columns 3114 and 3115 in the magnetic core 311 are different, i.e. the length of side column of 3114 is greater than the length of side column of 3115, thereby conveniently fabricating the primary-side or secondary-side outlet connector vias, wiring the first circuit module or the second circuit module, thus advantageously reducing the volume of the transformer and reducing the leakage inductance formed from primary-side outlet connector loop or the leakage inductance formed from secondary-side outlet connector loop.

6$^{th}$ Embodiment

Figure 8:
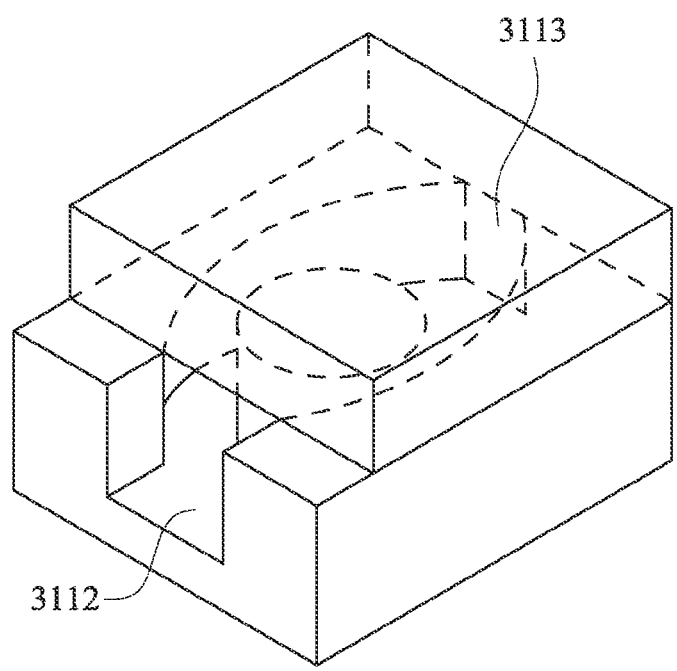
FIG. 8 is a schematic structure diagram showing a magnetic core set according to a 6$^{th}$ embodiment of the present invention.

Referring to FIG. 8, FIG. 8 is a schematic structure diagram showing a magnetic core set according to a 6$^{th}$ embodiment of the present invention.

This embodiment is based on the 3$^{rd}$ to 5$^{th}$ embodiments, the secondary-side opening 3112 and the primary-side opening 3113 is not symmetric in shape with respect to the magnetic core column 3111. Specifically, the magnetic side column 3114 and 3115 are both extended toward the primary-side opening 3113 along their curved profiles to increase the volumes of the side column 3115 and 3115, thus reducing the magnetic core loss.

7$^{th}$ Embodiment

Figure 9A:
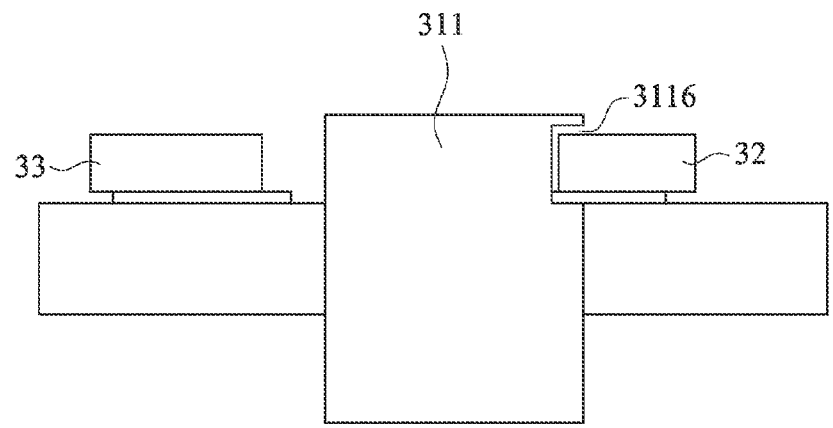
FIG. 9A is a schematic structure diagram showing an electronic device according to a 7$^{th}$ embodiment of the present invention.
Figure 9B:
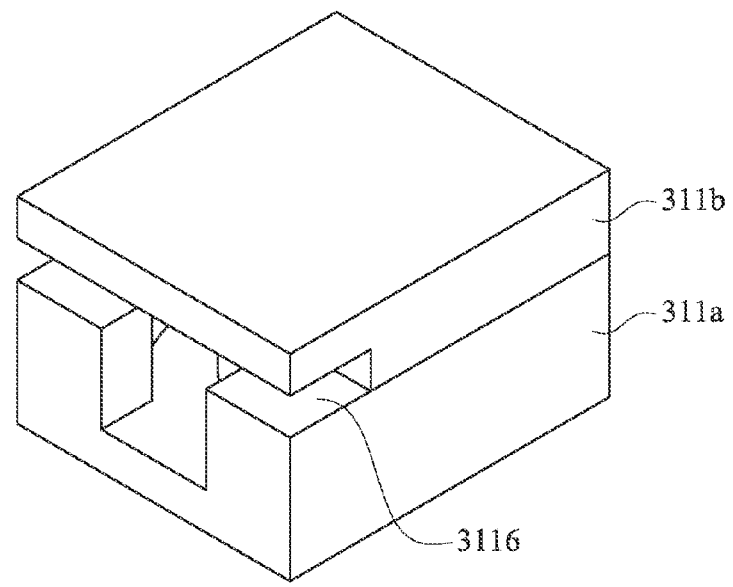
FIG. 9B is a schematic structure diagram showing a magnetic core set of the electronic device shown in FIG. 9A.

Referring to FIGS. 9A and 9B, FIG. 9A is a schematic structure diagram showing an electronic device according to a 7$^{th}$ embodiment of the present invention, and FIG. 9B is a schematic structure diagram showing a magnetic core set of the electronic device shown in FIG. 9A.

In this embodiment, the vertical projection areas of the first magnetic core component 311a and the second magnetic core component 311b of the magnetic element 311 on the first plane cover the entire vertical projection area of the winding on the first plane. A groove 3116 is defined on the second core magnetic 311b of the magnetic set 311, and the second circuit module 32 is disposed in the groove 3116, such that the second circuit module 32 has an overlap portion with the vertical projection area of the winding on the first plane, thereby reducing the leakage inductance formed form secondary-side outlet connector loop. It is noted that, in other embodiments, a groove may be defined on the first core component 311a, and at least one portion of the second circuit module 32 is disposed in the groove 3116; and at least one portion of the first circuit module 33 may also be disposed in the groove, thereby reducing the leakage inductance of the primary-side outlet connector loop.

8$^{th}$ Embodiment

Figure 10:
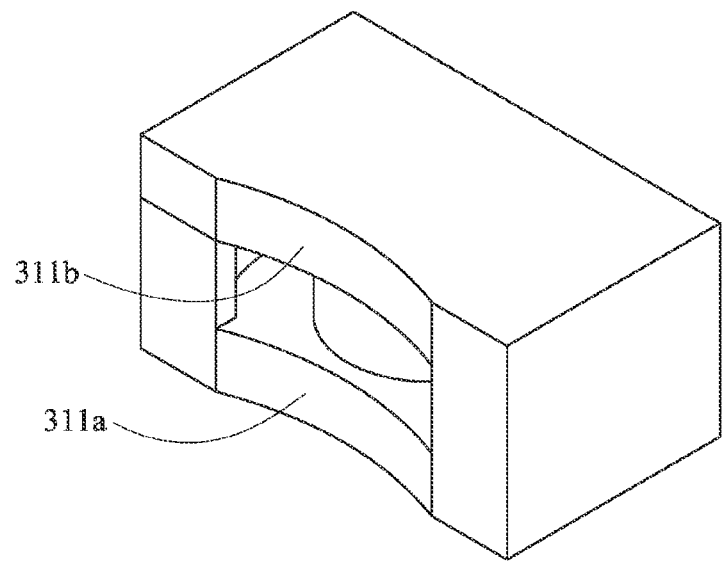
FIG. 10 is a schematic structure diagram showing a magnetic core set according to an 8$^{th}$ embodiment of the present invention.

Referring to FIG. 10, FIG. 10 is a schematic diagram of structure showing a magnetic core set according to an 8$^{th}$ embodiment of the present invention.

The difference between this embodiment and the 1$^{st}$ embodiment is that the first magnetic core component 311a and the second magnetic core component 311b are in concave arc shapes along the secondary-side opening 3112 or the primary-side opening 3113, such that the second circuit module 32 or the first circuit module 33 is moved toward the magnetic core column 3111 correspondingly, thereby reducing the magnetic core loss, and reducing the leakage inductance formed from the secondary-side outlet connector loop or the primary-side outlet connector loop.

9$^{th}$ Embodiment

Figure 11:
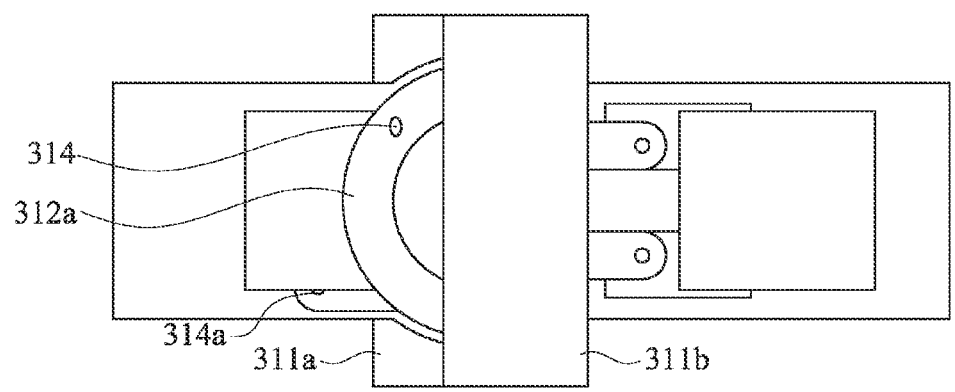
FIG. 11 is a schematic structure diagram showing an electronic device according to a 9$^{th}$ embodiment of the present invention.

Referring to FIG. 11, FIG. 11 is a schematic diagram of structure showing an electronic device according to a 9$^{th}$ embodiment of the present invention.

The difference between this embodiment and the 3$^{rd}$ embodiment is that secondary-side outlet connector vias 314a is disposed on the outside area of winding 312a, and another secondary-side outlet connector vias 314 are disposed on an area of the winding 312a for conveniently fabricating the secondary-side outlet connector vias.

10$^{th}$ Embodiment

Figure 12A:
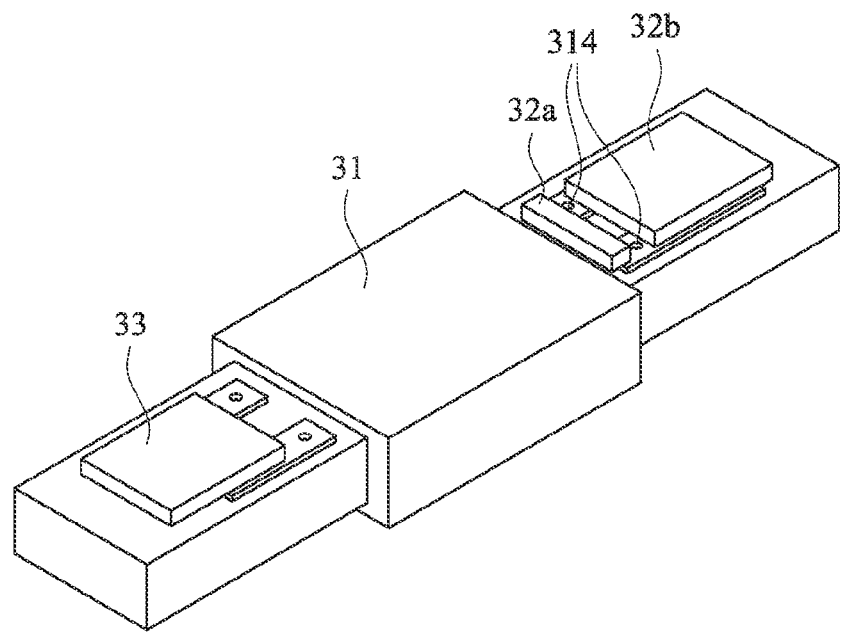
FIG. 12A is a schematic structure diagram showing an electronic device according to a 10$^{th}$ embodiment of the present invention.

Referring to FIG. 12A, FIG. 12A is a schematic structure diagram showing an electronic device according to a 10$^{th}$ embodiment of the present invention.

In this embodiment, the second circuit module 32 is divided into two circuit modules 32a and 32b, and the circuit module 32a includes the elements sensitive to leakage inductance, and the circuit module 32b includes the elements that are not sensitive to leakage inductance. The circuit module 32a is disposed at a side of the secondary-side outlet connector vias 314 near the magnetic core set 31. For example, a switch, a capacitor, etc. are disposed at a side near the magnetic core set 31, and the circuit module 32b is disposed at another side away from the magnetic core set 31.

Figure 12B:
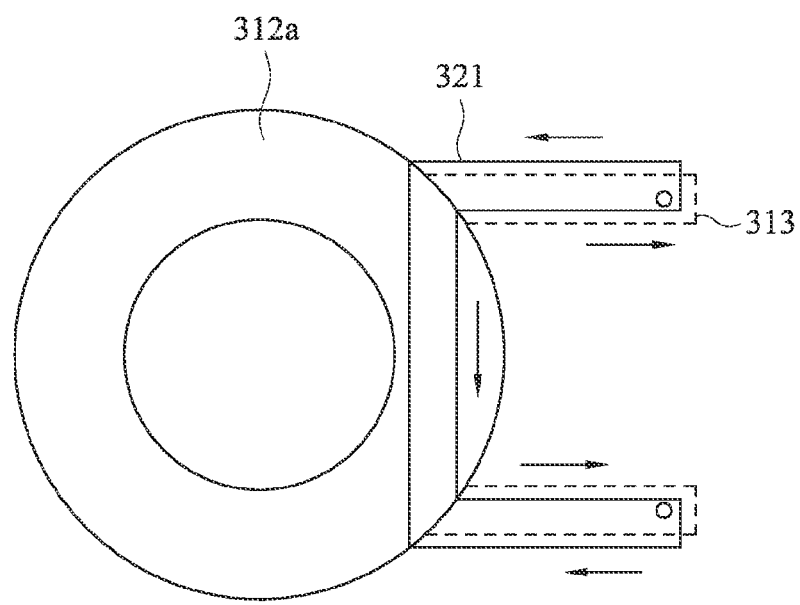
FIG. 12B is a schematic diagram showing the principle of a secondary-side outlet connector of the electronic device shown in FIG. 12A.

Further referring to FIG. 12B, FIG. 12B is a schematic diagram showing the principle of a secondary-side outlet connector of the electronic device shown in FIG. 12A.

As shown in FIG. 12B, the secondary-side outer outlet connector 321 is parallel to the secondary-side inner outlet connector 313, and the influence of the leakage inductance of the secondary-side outlet connector can be greatly reduced because the currents flowing therein are equivalent in size and opposite in directions, and the magnetic fields generated are offset to each other.

Especially, the aforementioned phenomenon is apparent when the magnetic core set of the 3$^{th}$, 4$^{th}$, 5$^{th}$, 6$^{th}$, 7$^{th}$ or 8$^{th}$ embodiment is used as the magnetic core set 31. Experimental results show that: for a specific planar transformer, the structure of FIG. 12A has a total leakage inductance of 1.13 uH, and the total leakage inductance is composed of the leakage inductance in window and the leakage inductance of the secondary-side outlet connector, in which the leakage inductance in window is 0.72 uH. In this embodiment, the total leakage inductance is reduced to 0.77 uH. That is, the leakage inductance of the secondary-side outlet connector is reduced from 0.41 uH to 0.05 uH, and the leakage inductance generated from secondary-side is almost eliminated.

It is noted that, the aforementioned embodiment is described to mainly improve the layout of the second circuit module 32 to have an overlap portion with the projection area of the winding 312 on the first plane, but in some other embodiments, the first circuit module 33 can be processed similarly to have an overlap portion with the projection area of the winding 312.

11$^{th}$ Embodiment

Figure 13:
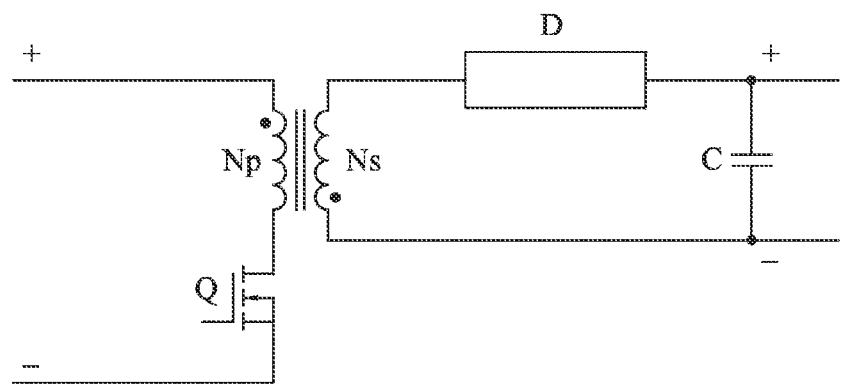
FIG. 13 is a schematic circuit diagram showing a transformer according to an 11$^{th}$ embodiment of the present invention.

Referring to FIG. 13, FIG. 13 is a schematic circuit diagram showing a transformer according to an 11$^{th}$ embodiment of the present invention.

As shown in FIG. 13, a primary-side circuit includes a primary winding Np and a switch Q, and the secondary-side circuit includes a secondary winding Ns, a switch D (such as a switch diode) and a capacitor C.

The 1$^{st}$ to 10$^{th}$ embodiments are relatively suitable for use in a flyback converter shown in FIG. 13. The decrease of leakage inductance may effectively promote the efficiency of a flyback converter, lower a voltage peak of the switch Q at the primary side when the switch Q is turned off instantaneously, and prevent a breakdown of the switch Q at the primary side. However, the electronic devices shown in the 1$^{st}$ to 10$^{th}$ embodiments are not limited to this converter, and those skilled in the art may make replacements in accordance with actual applications.

Figure 14A:
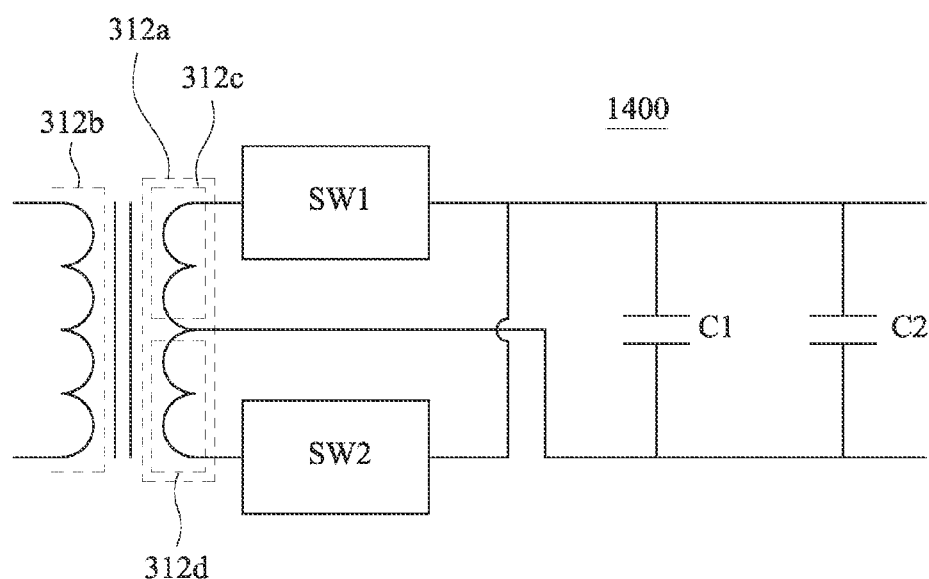
FIG. 14A is a schematic diagram showing a center-tap full-wave rectifier circuit.

Referring to FIG. 14A, FIG. 14A is a schematic diagram showing a center-tap full-wave rectifier circuit.

As shown in FIG. 14A, a second circuit module 32 of a center-tap full-wave rectifier circuit 1400 includes a first switch module SW1, a second switch module SW2, a first capacitor module C1 and a second capacitor module C2. The first switch module SW1 and the first capacitor module C1 are coupled to a first secondary winding component 312c of the winding (such as a secondary winding) 312a, and the second switch module SW2 and the second capacitor module C2 are coupled to a second secondary winding component 312d of the winding 312a.

More embodiments are provided in the blow, and the connection structure described in the aforementioned electronic device 3 can be used to realize the center-tap full-wave rectifier circuit 1400 shown in FIG. 14, but the present invention is not limited to the following embodiments.

12$^{th}$ Embodiment

Figure 14B:
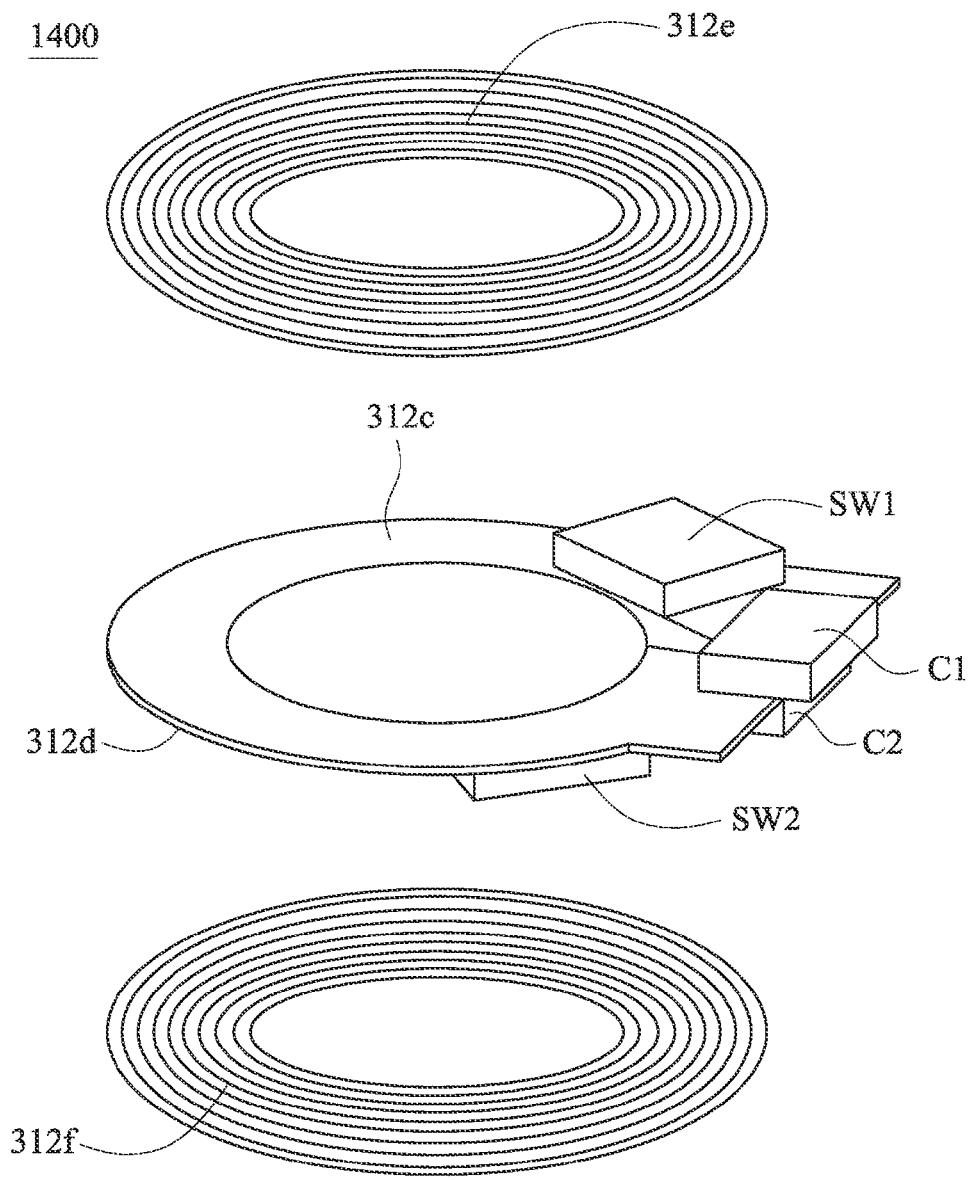
FIG. 14B is an exploded view showing the electronic device shown according to a 12$^{th}$ embodiment of the present invention.

Referring to FIG. 14B, FIG. 14B is an exploded view showing the electronic device shown according to a 12$^{th}$ embodiment of the present invention.

The first winding (such as a primary winding) 312b of the center-tap full-wave rectifier circuit 1400 is divided into a first primary winding component 312e and a second primary winding component 312f. For example, the first primary winding component 312e and the second primary winding component 312f may be planar windings formed from circular wires, and the second winding (such as secondary winding) 312a of the center-tap full-wave rectifier circuit 1400 may be a winding structure of a two-layer PCB board, and the winding of the upper PCB board is the first secondary winding component 312c, and the winding of the lower PCB board is the second secondary winding component 312d.

Figure 14C:
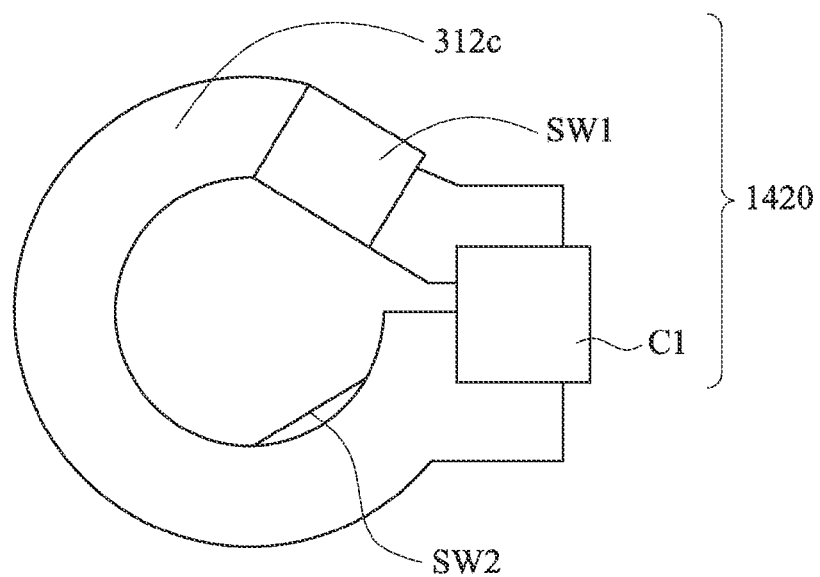
FIG. 14C is a top view showing a secondary winding shown in FIG. 14B.
Figure 14D:
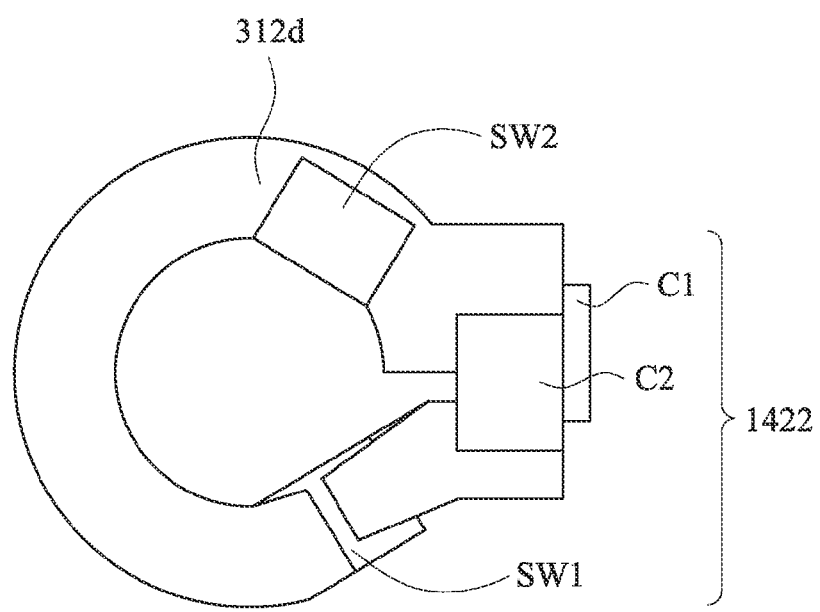
FIG. 14D is a bottom view showing a secondary winding shown in FIG. 14B.
Figure 14E:
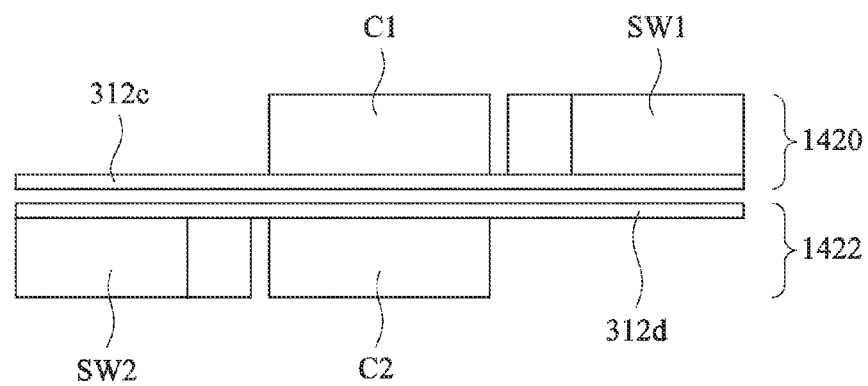
FIG. 14E is a side view showing a secondary winding shown in FIG. 14B.

Referring to FIGS. 14C, 14D and 14E together, FIG. 14C is a top view of the secondary winding shown in FIG. 14B, FIG. 14D is a bottom view of the secondary winding shown in FIG. 14B, FIG. 14E is a side view of the secondary winding shown in FIG. 14B.

As shown in FIGS. 14C and 14D, the first switch module SW1 and the first capacitor module C1 are disposed on a top surface of the first secondary winding, and the first secondary winding component 312c, the first switch module SW1 and the first capacitor C1 are coupled to one another to form a first AC loop 1420; and the second switch module SW2 and the second capacitor module C2 are disposed on a bottom surface of the second secondary winding, and the second secondary winding component 312d, and the second switch module SW2 and the second capacitor C2 are coupled to one another to form a second AC loop 1422. Each of the aforementioned AC loops contains quite a lot of AC current component, and thus is defined as an AC loop. The configuration structure of the two loops is shown in FIG. 14E, in which the first capacitor module C1 and the second capacitor module C2 are disposed corresponding to each other.

Referring to FIGS. 14B, 14C and 14D, the vertical projection areas of the first primary winding 312e and its AC loop (not shown) on the first plane is defined as a first projection surface; the vertical projection areas of the second primary winding 312f and its AC loop (not shown) on the first plane is defined as a second projection surface; the vertical projection area of the aforementioned first AC loop 1420 on the first plane is defined as a third projection surface; and the vertical projection area of the aforementioned second AC loop 1422 on the first plane is defined as a fourth projection surface. In FIG. 14B, an area ratio of the third projection surface to an overlap area of the first, second, third and fourth projection surfaces is in a range from about 1 to about 1.2; and an area ratio of the fourth projection surface to an overlap area of the first, second, third and fourth projection surfaces is in a range from about 1 to about 1.2. In other words, in this embodiment, an area ratio of a vertical projection area of any AC loop around the same magnetic core column on the first plane to an overlap portion of the vertical projection area of all of the loops around the same magnetic core column of a magnetic core set on the first plane is in a range from about 1 to about 1.2.

Therefore, for the structure in this embodiment, this embodiment cuts off a planar winding of the magnetic element at an arbitrary position and connects the windings with the circuit modules having the connection relationships therewith, thereby shortening the length of the circuit loop and the volume of the entire element, further increasing the couplings between the windings, thus reducing the leakage inductance between the windings, and the equivalent capacitor and parasitic capacitor of the loop. Furthermore, the second circuit module 32 in this embodiment is formed from the first switch module SW1 and the first capacitor C1 or formed form the second switch module SW2 and the second capacitor C2, but is not limited thereto. The second circuit module 32 may be a rectifier circuit module and can be flexibly replaced by those skilled in the art.

Moreover, the element structure in this embodiment is also suitable for use in a full-wave rectifier circuit in which only one capacitor is used. For example, the aforementioned first capacitor C1 may be disposed on a top surface of the first secondary winding component 312c and couple to the first switch module SW1, and the aforementioned second switch module SW2 may be disposed on a bottom surface of the second secondary winding component 312d, and the second switch module SW2 may couple to the first capacitor C1 by vias disposed on the secondary winding 312b.

Besides, the first switch module SW1 or the second switch module SW2 in this embodiment can be a chip, and the chip is disposed in a PCB board. The first capacitor module C1 or the second capacitor module C2 may be operated by directly using a capacitor element or may be formed from doping a dielectric material into a PCB base material, thereby further reducing the volume of the element. Moreover, the winding structure in this embodiment is not limited to an arrangement order "primary side-secondary side-secondary side-primary side" only, and those skilled in the art may make corresponding changes, such as "secondary side-primary side-primary side-secondary side".

13$^{th}$ Embodiment

Figure 15A:
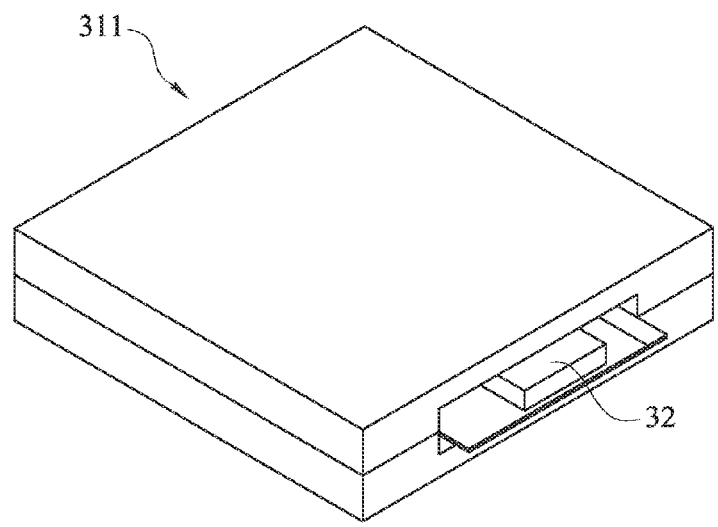
FIG. 15A is a schematic structure diagram showing an electronic device according to a 13$^{th}$ embodiment of the present invention.

Referring to FIG. 15A, FIG. 15A is a schematic structure diagram showing an electronic device according to a 13$^{th}$ embodiment of the present invention. As shown in FIG. 15A, in this embodiment, vertical projection areas of the magnetic core set 311 has an overlap portion with the vertical projection of the second circuit module 32 on the first plane.

Figure 15B:
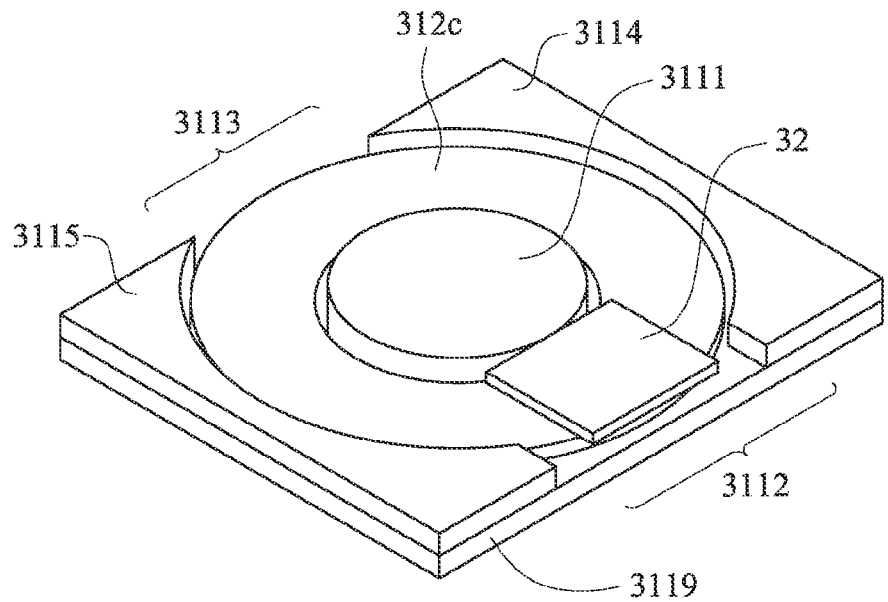
FIG. 15B is a schematic structure diagram showing a magnetic core set shown in FIG. 15A.

Referring to FIG. 15B, FIG. 15B is a schematic structure diagram showing a magnetic core set shown in FIG. 15A. A width of the aforementioned second circuit module 32 is too large to be disposed in the magnetic core set 311. As shown in FIG. 15B, the secondary-side opening 3112 and the primary-side opening 3113 are not symmetric with respect to the magnetic core column 3111 in the magnetic core set, and the second circuit module 32 is disposed in the wider one of the primary-side opening 3113 and the secondary-side opening 3112. Using FIG. 15B as an example, the second circuit module 32 may be disposed in the seconddary opening 3112. Through this arrangement, an area ratio of the vertical projection area of the aforementioned AC loop on the first plane to the overlap poriton of the vertical projection areas of all of the loops around the same column of the magnetic core set on the first plane can be in a range less than 1.2.

14$^{th}$ Embodiment

Figure 16A:
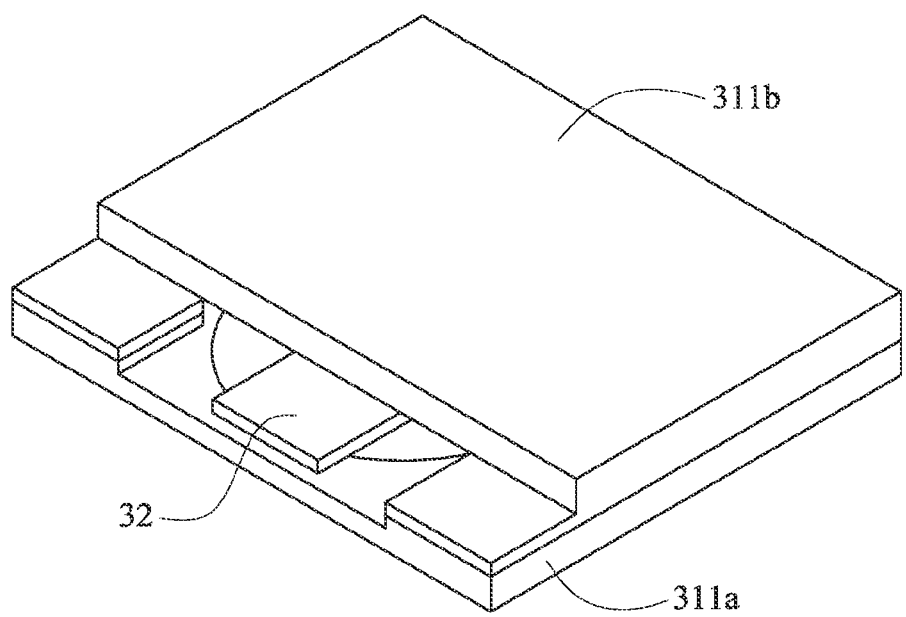
FIG. 16A is a schematic structure diagram showing an electronic device according to a 14$^{th}$ embodiment of the present invention.
Figure 16B:
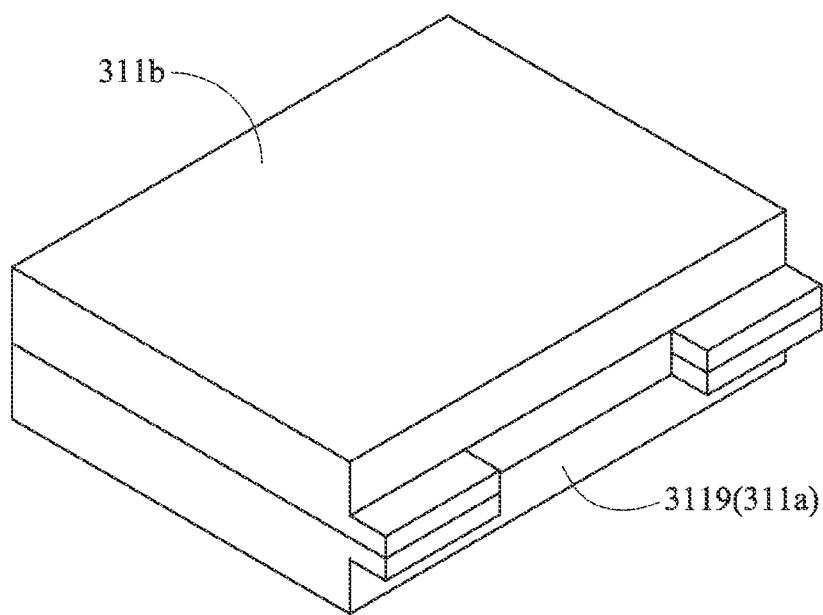
FIG. 16B is another schematic structure diagram showing an electronic device according to a 14$^{th}$ embodiment of the present invention.
Figure 16C:
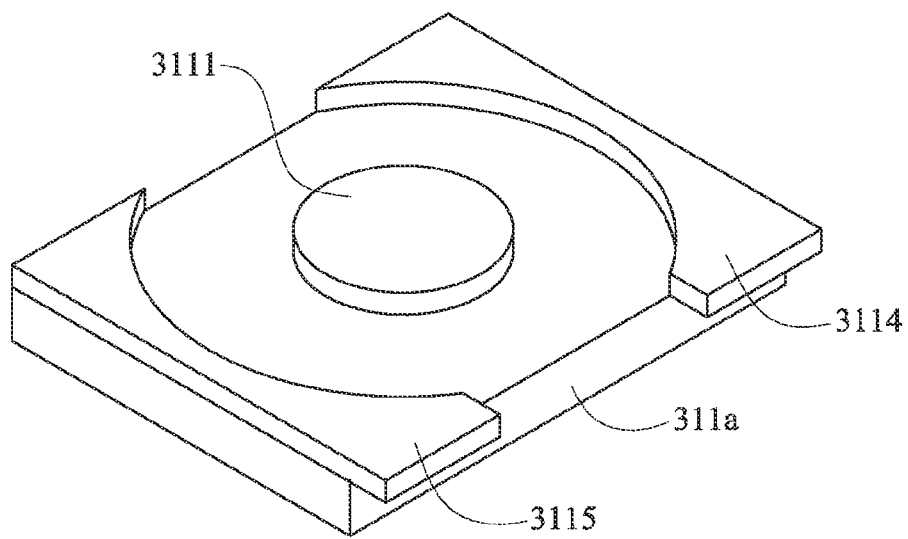
FIG. 16C is a schematic structure diagram showing a magnetic core set shown in FIG. 16B.

Referring to FIG. 16A, FIG. 16A is a schematic structure diagram showing an electronic device according to a 14$^{th}$ embodiment of the present invention. As shown in FIG. 16A, in this embodiment, the vertical projection area of the second core component 311b on the first plane falls within a vertical projection area of the core cover plate 3119 of the first magnetic core component 311a on the first plane. The structure shown in this embodiment is suitable for use in the aforementioned second circuit module 32 of which the height is greater than the height of the magnetic core set 311 allowed to be disposed, in which the second circuit module 32 is disposed by cutting off a portion of the second circuit magnetic core component 311b. Alternatively, referring to FIG. 16B and FIG. 16C, this embodiment may also dispose the second circuit module 32 by cutting off a portion of each of the top cover plate and the bottom cover plate.

15$^{th}$ Embodiment

Figure 16D:
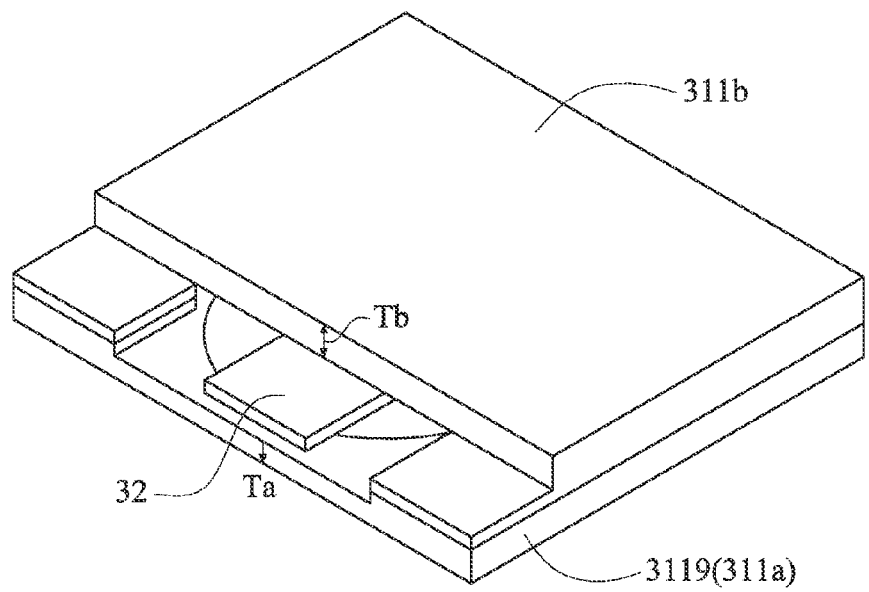
FIG. 16D is a schematic structure diagram showing an electronic device according to a 15$^{th}$ embodiment of the present invention.

Referring to FIG. 16D, FIG. 16D is a schematic structure diagram showing an electronic device according to a 15$^{th}$ embodiment of the present invention. The difference between the 15$^{th}$ embodiment and the 14$^{th}$ embodiment is that a thickness Tb of the second core component 311b is greater than a thickness Ta of the core cover plate 3119 of the first core component 311a. Because the 14$^{th}$ embodiment cutting off a portion of the second core component 311b will result in the increase of the magnetic core loss, the 15$^{th}$ embodiment increases the thickness Tb of the second core component 311b to reduce the magnetic core loss.

16$^{th}$ Embodiment

Referring to FIG. 10, FIG. 10 is a schematic structure diagram showing a magnetic core set of an 16$^{th}$ embodiment of the present invention. When a height and a width of the second circuit module 32 both are greater than a space in which the magnetic core set 311 can be disposed, as shown in FIG. 10, the first magnetic core component 311a and the second magnetic core component 311b are concave arc shapes along the secondary-side opening 3112 or the primary-side opening 3113, so as to dispose at least one portion of second circuit module 32 in the concave arc area.

17$^{th}$ Embodiment

Figure 17:
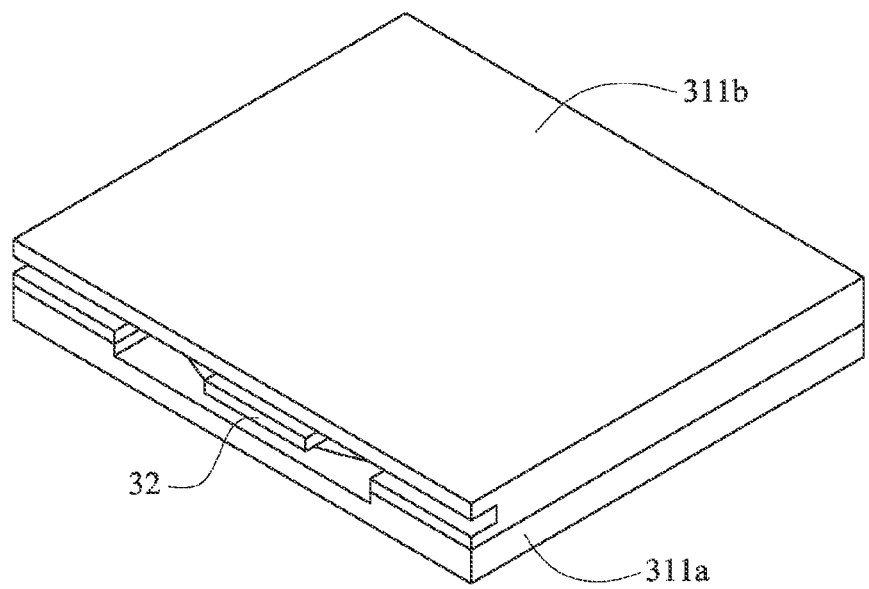
FIG. 17 is a schematic structure diagram showing an electronic device according to a 17$^{th}$ embodiment of the present invention.

Referring to FIG. 17, FIG. 17 is a schematic structure diagram showing an electronic device according to a 17$^{th}$ embodiment of the present invention. When a height and a width of second circuit module 32 both are greater than a space in which the magnetic core set 311 can be disposed, an accommodation portion may be disposed in the magnetic core set 311 for receiving at least one portion of the second circuit module 32. As shown in FIG. 17, the accommodation portion has a groove, and the groove may be disposed on the first core component 311a or the second core component 311b, and at least one portion of the second circuit module 32 is disposed in the groove. Alternatively, the structure of FIG. 9 may be used to adjust the magnetic core set for receiving the circuit module.

18$^{th}$ Embodiment

Figure 18:
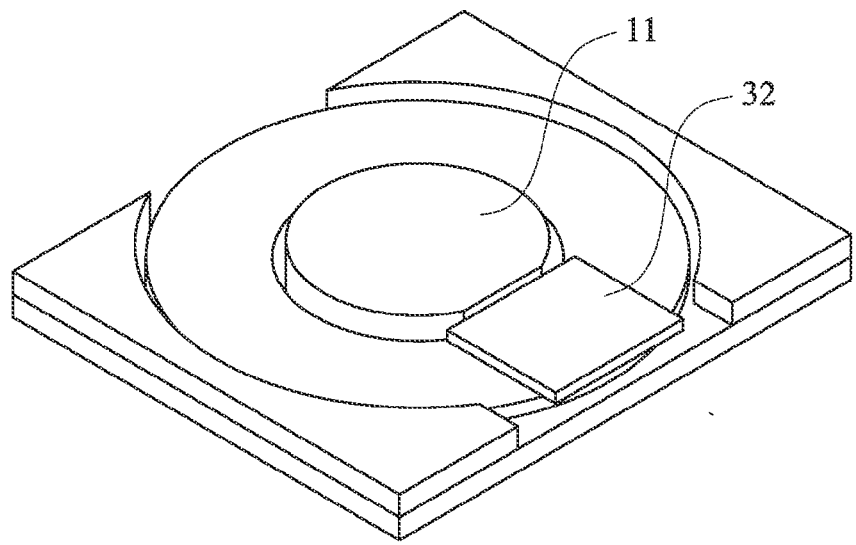
FIG. 18 is a schematic structure diagram showing an electronic device according to an 18$^{th}$ embodiment of the present invention.

Referring to FIG. 18, FIG. 18 is a schematic structure diagram showing an electronic device according to an 18$^{th}$ embodiment of the present invention. Similar to the 17$^{th}$ embodiment, when a height and a width of second circuit module 32 both are greater than a space in which the magnetic core set 311 can be disposed, an accommodation portion is disposed in the magnetic core set 311 for receiving at least one portion of the second circuit module 32. As shown in FIG. 18, a portion of the magnetic core column 3111 of the magnetic core set 311 is cut off to receive the second circuit module 32, i.e., the accommodation portion is disposed at a side of the magnetic core column 3111 near the second circuit module 32.

19$^{th}$ Embodiment

Figure 19:
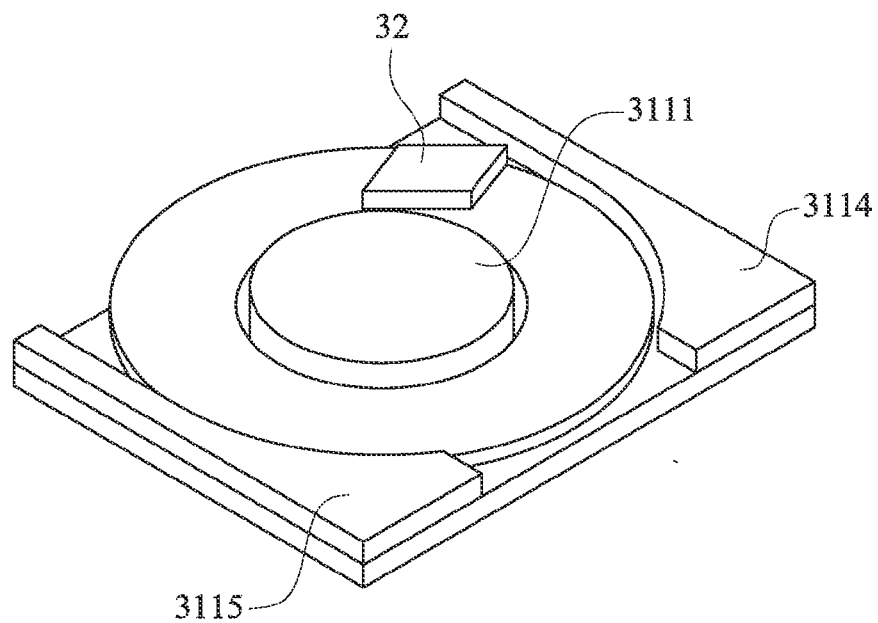
FIG. 19 is a schematic structure diagram showing an electronic device according to a 19$^{th}$ embodiment of the present invention.

Referring to FIG. 19, FIG. 19 is a schematic structure diagram showing an electronic device according to a 19$^{th}$ embodiment of the present invention. When a width of second circuit module 32 is greater than a space in which the magnetic core set 311 can be disposed, as shown in FIG. 18, a portion of the magnetic core side column 3114 or 3115 of the magnetic core set 311 may be cut off to receive at least one portion of the second circuit module 32, i.e., the accommodation portion is disposed on the magnetic core side column 3114 or the magnetic core side column 3115 near the second circuit module 32. Through this arrangement, an area ratio of the vertical projection area of any AC loop around the same magnetic core column on the first plane to an overlap portion of the vertical projection areas of all of the loops around the same magnetic core column on the first plane is in a range close to 1. Alternatively, the structure shown in FIG. 7 may also be used for adjusting the magnetic core side column to receive the circuit module.

20$^{th}$ Embodiment

Figure 20A:
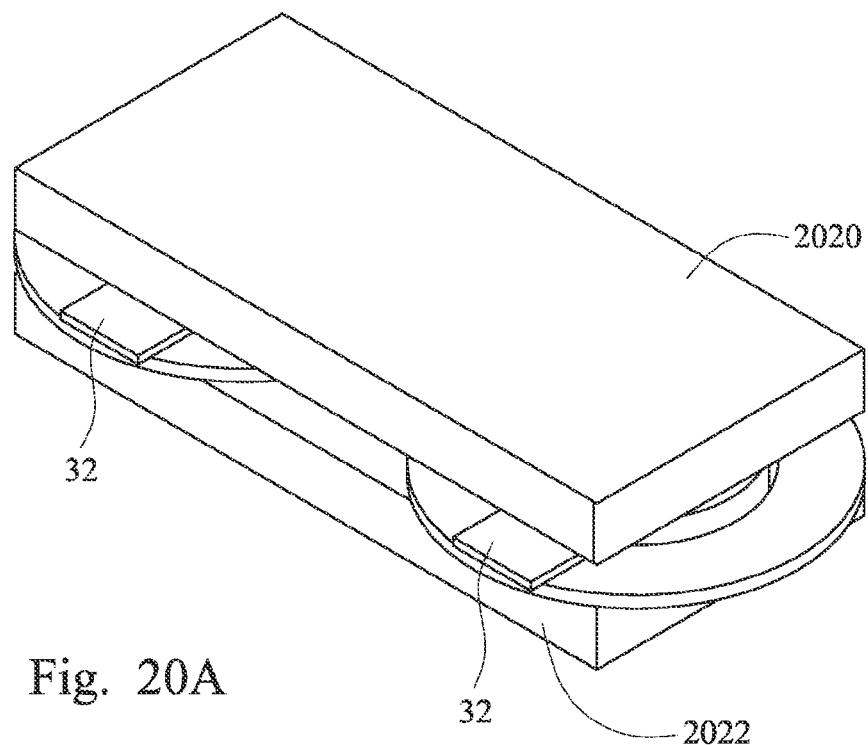
FIG. 20A is a schematic structure diagram showing an electronic device according to a 20$^{th}$ embodiment of the present invention.
Figure 20B:
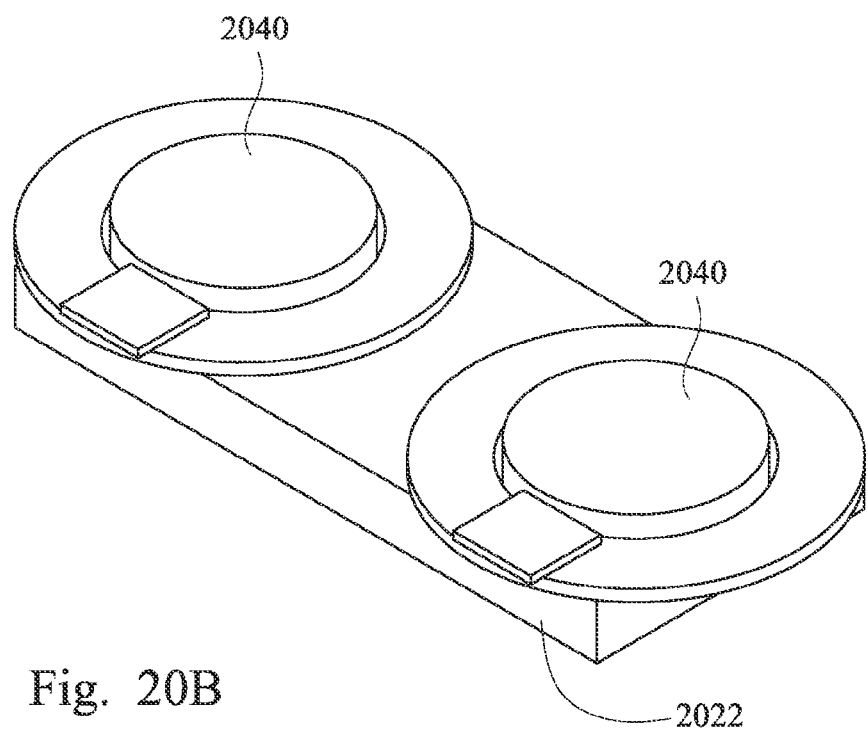
FIG. 20B is a schematic structure diagram showing a magnetic core set shown in FIG. 20A.

Referring to FIG. 20A and FIG. 20B, FIG. 20A is a schematic structure diagram showing an electronic device according to a 20$^{th}$ embodiment of the present invention; and FIG. 20B is a schematic diagram of structure showing a magnetic core set shown in FIG. 20A. In comparison with the aforementioned embodiments using the EQ-type magnetic core as an example, a U-type magnetic core is exemplified in this embodiment. The magnetic core set 311 in this embodiment includes a first core cover plate 2020, a second core cover plate 2022 and a plurality of magnetic core column 2040, and two magnetic core columns are exemplified in this embodiment. A plurality of the magnetic core column 2040, connected to the first core cover plate 2020 and the second core cover plate 2022 to form a magnetic close loop. For clear explanation, referring to FIG. 20B, an area ratio of the vertical projection area of any AC loop around the same magnetic core column on the first plane to an overlap portion of the vertical projection areas of all of the loops around the same magnetic core column on the first plane is in a range from about 1 to about 1.2. In this embodiment, the second core cover plate 2022 may cover the second circuit module 32, i.e., the projection areas of the second circuit the magnetic core have an overlap portion.

21$^{st}$ Embodiment

Figure 21:
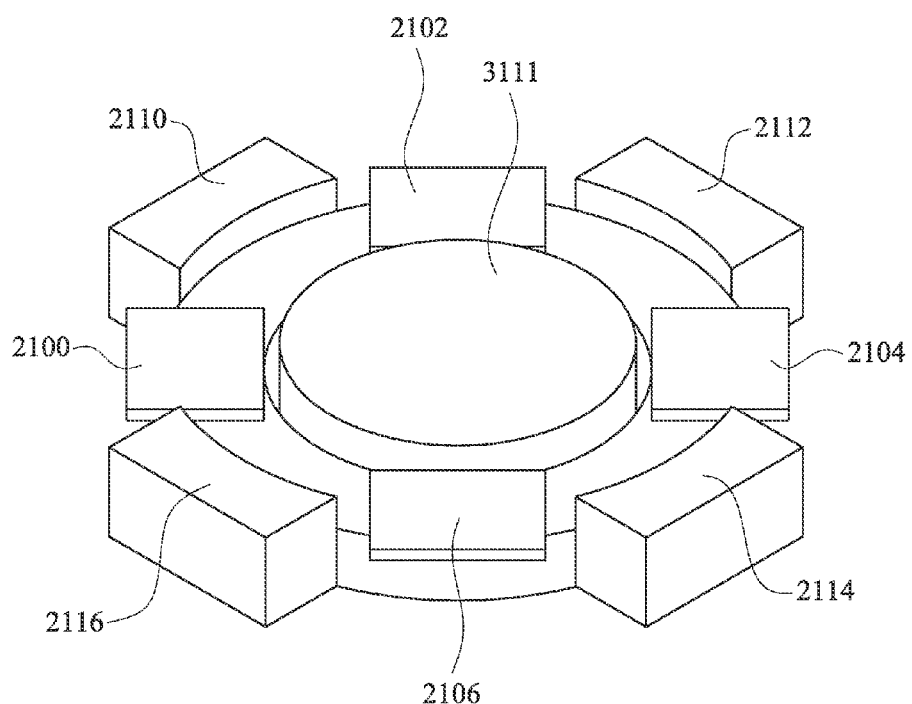
FIG. 21 is a schematic structure diagram of showing an electronic device according to a 21$^{st}$ embodiment of the present invention.

Referring to FIG. 21, FIG. 21 is a schematic structural diagram showing an electronic device according to a 21$^{st}$ embodiment of the present invention. As shown in FIG. 21, when a number of circuit modules need to be connected to a magnetic component, the quantity of side columns of the magnetic core set 311 may be adjusted for disposing the circuit modules. For example, if the magnetic component needs to be connected to the circuit modules 2100, 2102, 2104 and 2106, a number of side columns 2110, 2112, 2114 and 2116 can be disposed around the magnetic core column 3111, and the side columns can be connected to the first core cover plate of magnetic core set and a second core cover plate of magnetic core set to form side openings for accommodating a PCB board and circuit modules on the PCB board. When more circuit modules are disposed, the length of winding corresponding to circuit modules is shorter and the magnetic core loss is less. Furthermore, if the heat radiation and arrangement of the circuit module are taken into consideration, the arrangement of the magnetic side column can also be adjusted correspondingly.

It is worthy to be noted that, most of the embodiments 14$^{th}$ embodiment to 21$^{st}$ embodiment use the full wave rectifier circuit 1400 in FIG. 14A as an example, and the magnetic component using the connecting structures of the embodiments 14$^{th}$ embodiment to 21$^{st}$ embodiment can achieve that: an area ratio of a vertical projection area of any AC loop around the same magnetic core column on the first plane to an overlap portion of the vertical projection areas of all of the loops around the same magnetic core column on the first plane is in a range from about 1 to about 1.2. The aforementioned embodiments are also suitable for use in different circuits, and the first circuit module 33 coupled to the first winding (such as primary winding) 312b is also suitable for use in the various connecting structures described above. Furthermore, an EQ-type magnetic core and a U-type magnetic core are exemplified in the aforementioned embodiments, but the present invention is also suitable for use in an EE-type magnetic core, an EI-type magnetic core, an EFD-type magnetic core, a RM-type magnetic core or a tank-type magnetic core, and the circuit module is not be limited to the aforementioned switch modules or capacitor modules. Those skilled in the art may adjust various magnetic core structures and the corresponding circuit module structures.

It can be known from the above that, the electronic devices of the present invention changes the outlet connector structures of the first circuit module, the outlet connector structures of the second circuit module, the outlet connector structures of the magnetic element and the structure of the magnetic core set to reduce the energy stored by the magnetic field formed form the secondary-side outlet connector loop and the primary-side outlet connector loop, thus reducing the leakage inductance formed from the secondary-side outlet connector loop and the primary-side outlet connector loop. Moreover, the aforementioned magnetic core set can be cutoff at an arbitrary position, and the magnetic component is connected to the circuit modules having connection relationships therewith, thus further reducing the volume of the element and the leakage inductances between the windings.

Although the present invention has been described as above, but should not be limited to the present invention, It will be apparent to those skilled in the art that various modifications and variations can be made to the structure of the present invention without departing from the scope or spirit of the invention, therefore, the scope of the present invention should be protected in conformity with the scope of the following claims.

What is claimed is:

1. An electronic device, comprising:
a magnetic element comprising a magnetic core set and a winding assembled in the magnetic core set, the winding comprising a first winding and a second winding;
a first circuit module coupled to the first winding of the magnetic element; and
a second circuit module coupled to the second winding of the magnetic element;
wherein a vertical projection area of at least one of the first circuit module and the second circuit module has an overlap portion with a vertical projection area of the winding of the magnetic element on a first plane, and the first plane is a horizontal plane at which the winding is located;
wherein at least one of the first circuit module and the second circuit module comprises a switch module and a capacitor module;
wherein at least one of the first circuit module and the second circuit module forms an AC loop with its corresponding winding, wherein an area ratio of a vertical projection area of the AC loop on the first plane to an overlap portion of vertical projection areas of all of the loops around the same magnetic core column of the magnetic core set on the first lane is in a range substantially from 1 to 1.2, wherein the AC loop comprises the switch module and the capacitor module.

2. The electronic device of claim 1, wherein the magnetic element is a transformer module, wherein the first winding is a primary winding, and the second winding is a secondary winding.

3. The electronic device of claim 2, wherein the transformer module is a planar transformer.

4. The electronic device of claim 2, wherein the magnetic core set comprises a first magnetic core component and a second magnetic core component corresponding to the first magnetic core component, the first magnetic core component having a magnetic core column, a core cover plate, a first side column, a second side column, a primary-side opening and a secondary-side opening, wherein the primary-side opening and the secondary-side opening are located at both ends of the first side column and the second side column, and the winding is assembled between the first magnetic core component and the second magnetic core component, and is mounted on the magnetic core column.

5. The electronic device of claim 4, wherein at least one uncovered area exists between a vertical projection area of the first magnetic core element or the second magnetic element on the first plane and the vertical projection area of the winding of the magnetic element on the first plane, such that at least one of at least one portion of the first circuit module and at least one portion of the second circuit module is vertically projected within the uncovered area and has an overlap portion with the vertical projection area of the winding on the first plane.

6. The electronic device of claim 5, wherein a thickness of the core cover plate of the first magnetic core component is greater than a thickness of the second magnetic core component when at least one uncovered area exists between the vertical projection area of the first magnetic core element on the first plane and the vertical projection area of the winding of the magnetic element on the first plane.

7. The electronic device of claim 5, wherein a thickness of core cover plate of the first magnetic core component is smaller than a thickness of the second magnetic core component when the at least one uncovered area exists between the vertical projection area of the second magnetic element on the first plane, and the vertical projection area of the winding of the magnetic element on the first plane.

8. The electronic device of claim 4, wherein the primary-side opening and the secondary-side opening are not symmetrical in shape with respect to the magnetic core column.

9. The electronic device of claim 4, wherein at least one uncovered area exists between vertical projection areas of the first magnetic core element and the second magnetic core element on the first plane and the vertical projection area of the winding of the magnetic element on the first plane, such that at least one of at least one portion of the first circuit module and at least one portion of the second circuit module is vertically projected within the uncovered area and has an overlap portion with the vertical projection area of the winding on the first plane.

10. The electronic device of claim 9, wherein the vertical projection area of the first magnetic core component has no overlap portion with the vertical projection area of the second magnetic core component on the first plane.

11. The electronic device of claim 9, wherein the vertical projection area of the first magnetic core component has no overlap portion with the vertical projection area of the second magnetic core component on the first plane.

12. The electronic device of claim 11, wherein the first side column and the second side column are not symmetric in shape with respect to the magnetic core column.

13. The electronic device of claim 12, wherein a length of the first side column is greater than a length of the second side column between the primary-side opening and the secondary-side opening.

14. The electronic device of claim 11, wherein shapes of the first magnetic core component and the second magnetic core component along the primary-side opening or the secondary-side opening are concave arcs.

15. The electronic device of claim 4, wherein a vertical projection area of the first magnetic core component and the second magnetic core component on the first plane have an overlap portion with the vertical projection area of the winding on the first plane, wherein the first magnetic core component or the second magnetic core component has a groove which has an overlap portion with the vertical projection area of the winding on the first plane, and at least one portion of the first circuit module or the second circuit module is disposed in the groove.

16. The electronic device of claim 4, wherein
both ends of the primary winding are connected to the first circuit module through a primary-side outlet connector which has a primary-side inner outlet connector, primary-side outlet connector vias and a primary-side outer outlet connector, wherein the primary-side inner outlet connector is electronically connected to the primary-side outer outlet connector through the primary-side outlet connector vias;
both ends of the secondary winding are connected to the second circuit module through a secondary-side outlet connector which has a secondary-side inner outlet connector, secondary-side outlet connector vias and a secondary-side outer outlet connector, wherein the secondary-side inner outlet connector is electronically connected to the secondary-side outer outlet connector through the secondary-side outlet connector vias.

17. The electronic device of claim 16, wherein
the primary-side outlet connector vias are disposed between the primary winding and the magnetic core column, or on the primary winding or an outside area of the primary winding;
the secondary-side outlet connector vias are disposed between the secondary winding and the magnetic core column, or on the secondary winding or an outside area of the secondary winding.

18. The electronic device of claim 17, wherein
a component of the first circuit module sensitive to leakage inductance is disposed at a side of the primary-side outlet connector vias near the magnetic core column when the primary-side outlet connector vias are disposed at an outside area of the primary winding;
a component of the second circuit module sensitive to leakage inductance disposed at a side of the secondary-side outlet connector vias near the magnetic core column when the secondary-side outlet connector vias are disposed on an outside area of the secondary winding.

19. The electronic device of claim 2, wherein the winding is a planar winding comprising a PCB winding or a round wire.

20. The electronic device of claim 2, wherein the electronic device is a flyback converter.

21. The electronic device of claim 2, wherein the second circuit module is a rectifier circuit module.

22. The electronic device of claim 1, wherein the first winding is a primary winding, and the first circuit module forms the AC loop with the primary winding.

23. The electronic device of claim 1, wherein the second winding is a secondary winding, and the second circuit module forms the AC loop with the secondary winding.

24. The electronic device of claim 23, wherein the second circuit module is a rectifier circuit module.

25. The electronic device of claim 24, wherein the secondary winding comprises a first secondary winding and the second secondary winding, and the rectifier circuit module comprises:
a first switch module;
a first capacitor module, wherein the first capacitor module and the first secondary winding are connected to the first secondary winding and disposed on an upper surface of the first secondary winding;
a second switch module; and
a second capacitor module, wherein the second capacitor module and the second switch module are connected to the second secondary winding and disposed on a lower surface of the second secondary winding.

26. The electronic device of claim 24, wherein the secondary winding comprises a first secondary winding and the second secondary winding, and the rectifier circuit module comprises:
a first switch module connected to the first secondary winding;
a first capacitor module, wherein the first capacitor module and the first switch module are connected to the first capacitor module and disposed on an upper surface of the first secondary winding; and
a second switch module disposed on the lower surface of the second secondary winding and connected to the capacitor module through the vias.

27. The electronic device of claim 25, wherein the first switch module, the first capacitor module, the second switch module or the second capacitor is disposed in a PCB board.

28. The electronic device of claim 26, wherein the first switch module, the first capacitor module, the second switch module or the second capacitor is disposed in a PCB board.

29. The electronic device of claim 25, wherein the first switch module or the second switch module is a chip disposed in a PCB board.

30. The electronic device of claim 26, wherein the first switch module or the second switch module is a chip disposed in a PCB board.

31. The electronic device of claim 25, wherein the capacitor module is formed from a PCB substrate doped with a dielectric material.

32. The electronic device of claim 26, wherein the capacitor module is formed from a PCB substrate doped with a dielectric material.

33. The electronic device of claim 1, wherein a vertical projection area of the magnetic core set on the first plane has an overlap portion with the vertical projection area of the first circuit module or the second circuit module on the first plane.

34. The electronic device of claim 33, wherein
the magnetic core set comprises a first magnetic core component and a second magnetic core component corresponding to the first magnetic core component, the first magnetic core component having a magnetic core column, a core cover plate, a first side column, a second side column, a primary-side opening and a secondary-side opening, wherein the primary-side opening and the secondary-side opening are located at both ends of the first side column and the second side column, and the winding is assembled between the first magnetic core component and the second magnetic core component on the magnetic core column.

35. The electronic device of claim 34, wherein the primary-side opening and the secondary-side opening are not symmetric in shape with respect to the magnetic core column, and the first circuit module or the second circuit module is disposed at a wider one of the primary-side opening and the secondary-side opening.

36. The electronic device of claim 34, wherein the vertical projection area of the second core component on the first plane falls within a vertical projection area of the core cover plate on the first plane.

37. The electronic device of claim 36, wherein a thickness of the second magnetic core component is greater than a thickness of the core cover plate of the first magnetic core component.

38. The electronic device of claim 34, wherein the first magnetic core component or the second magnetic core component has a concave arc along the primary-side opening or the secondary-side opening, and at least one portion of the first circuit module or at least one portion of the second circuit module is disposed in the concave arc.

39. The electronic device of claim 34, wherein the magnetic core set further comprises an accommodation portion for receiving the first circuit module or the second circuit module.

40. The electronic device of claim 39, wherein the accommodation portion is a groove which is disposed on the first magnetic core component or the second magnetic core component, and at least one portion of the first circuit module or the second circuit module is disposed in the groove.

41. The electronic device of claim 39, wherein the accommodation portion is disposed at a side of the magnetic core column near the first second circuit module or the second circuit module.

42. The electronic device of claim 39, wherein the accommodation portion is disposed at a side of the first side column or the second side column near the first second circuit module or the second circuit module.

43. The electronic device of claim 33, wherein the magnetic core set further comprises a first core cover plate, a second core cover plate and a plurality of the magnetic core columns which are connected to the first core cover plate and the second core cover plate to form a closed magnetic path.

44. The electronic device of claim 33, wherein the magnetic core set further comprises:
   a first core cover plate;
   a second core cover plate; and
   a plurality of side columns disposed around the magnetic core column of the magnetic core set, wherein the side columns are connected to the first core cover plate to form a plurality of side openings.

45. The electronic device of claim 1, wherein the magnetic core comprises an EQ-type magnetic core, a U-type magnetic core, an EE-type magnetic core, an EI-type magnetic core, an EFD-type magnetic core, a RM-type magnetic core or a tank-type magnetic core.

* * * * *